(12) United States Patent
Chen et al.

(10) Patent No.: US 12,487,700 B2
(45) Date of Patent: Dec. 2, 2025

(54) TOUCH DISPLAY PANEL, DRIVE METHOD, AND TOUCH DISPLAY APPARATUS

(71) Applicant: Honor Device Co., Ltd., Shenzhen (CN)

(72) Inventors: Pengming Chen, Shenzhen (CN); Jide Liang, Shenzhen (CN); Jiehua Tang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/290,505

(22) PCT Filed: Sep. 7, 2022

(86) PCT No.: PCT/CN2022/117532
§ 371 (c)(1),
(2) Date: Nov. 14, 2023

(87) PCT Pub. No.: WO2023/098205
PCT Pub. Date: Jun. 8, 2023

(65) Prior Publication Data
US 2024/0310947 A1   Sep. 19, 2024

(30) Foreign Application Priority Data
Nov. 30, 2021   (CN) ......................... 202111447852.1

(51) Int. Cl.
*G06F 3/041*   (2006.01)
*G06F 3/044*   (2006.01)
(Continued)

(52) U.S. Cl.
CPC ........ *G06F 3/04166* (2019.05); *G06F 3/0412* (2013.01); *G06F 3/04164* (2019.05);
(Continued)

(58) Field of Classification Search
CPC ............... G06F 3/04166; G06F 3/0446; G06F 3/04164; G06F 3/0412; H10K 59/40; G02F 1/13338
See application file for complete search history.

(56) References Cited

U.S. PATENT DOCUMENTS 9,665,229 B2   5/2017   Lu et al.
9,958,981 B2   5/2018   Yang et al.
(Continued)

FOREIGN PATENT DOCUMENTS

CN   102023739 A   4/2011
CN   103677412 A   3/2014
(Continued)

*Primary Examiner* — Ke Xiao
*Assistant Examiner* — Jennifer L Zubajlo
(74) *Attorney, Agent, or Firm* — Leydig, Voit & Mayer, Ltd.

(57) ABSTRACT

This application relates to the field of display technologies, and provides a touch display panel, a drive method, and a touch display apparatus, to improve sensitivity of touch and user experience. The touch display panel includes: a plurality of touch electrodes, where the touch electrode is configured to receive a touch scanning signal; and at least one auxiliary electrode, electrically connected to the touch electrode and configured to provide an auxiliary signal to the touch electrode when the touch electrode receives the touch scanning signal, where the auxiliary signal is the same as the touch scanning signal.

17 Claims, 12 Drawing Sheets

(51) Int. Cl.
  *H10K 59/40*  (2023.01)
  *G02F 1/1333*  (2006.01)
(52) U.S. Cl.
  CPC ........ *G06F 3/0446* (2019.05); *G02F 1/13338* (2013.01); *H10K 59/40* (2023.02)

(56) References Cited

U.S. PATENT DOCUMENTS

| | | | |
|---|---|---|---|
| 9,965,084 | B2 | 5/2018 | Zhang |
| 10,162,450 | B2 | 12/2018 | Lu et al. |
| 10,949,044 | B1 * | 3/2021 | Lee ........................ G06F 3/0412 |
| 11,586,332 | B2 | 2/2023 | Lu |
| 2011/0067933 | A1 | 3/2011 | Chang et al. |
| 2018/0150176 | A1 | 5/2018 | Kim et al. |
| 2021/0342035 | A1 * | 11/2021 | Zhao ..................... G09G 3/3241 |
| 2021/0382599 | A1 * | 12/2021 | Gong ..................... G06F 3/0412 |
| 2022/0069027 | A1 | 3/2022 | Wang et al. |

FOREIGN PATENT DOCUMENTS

| | | | | |
|---|---|---|---|---|
| CN | 104330935 | A | 2/2015 | |
| CN | 104484084 | A | 4/2015 | |
| CN | 104571763 | A | 4/2015 | |
| CN | 105929994 | A | 9/2016 | |
| CN | 106843584 | A | 6/2017 | |
| CN | 106933414 | A | 7/2017 | |
| CN | 106991986 | A | 7/2017 | |
| CN | 107843996 | A * | 3/2018 | ............. G06F 3/041 |
| CN | 107845645 | A | 3/2018 | |
| CN | 108491109 | A | 9/2018 | |
| CN | 111610887 | A | 9/2020 | |
| CN | 111799320 | A | 10/2020 | |
| CN | 112698746 | A | 4/2021 | |
| CN | 112799538 | A | 5/2021 | |
| CN | 112882610 | A | 6/2021 | |
| CN | 113126824 | A | 7/2021 | |
| CN | 115016667 | A | 9/2022 | |
| JP | 201268405 | A | 4/2012 | |

* cited by examiner

TOUCH DISPLAY PANEL, DRIVE METHOD, AND TOUCH DISPLAY APPARATUS

CROSS-REFERENCE TO RELATED APPLICATIONS

This application is a national stage of International Application No. PCT/CN2022/117532, filed on Sep. 7, 2022, which claims priority to Chinese Patent Application No. 202111447852.1, filed on Nov. 30, 2021. The disclosures of both of the aforementioned applications are hereby incorporated by reference in their entireties.

TECHNICAL FIELD

This application relates to the field of display technologies, and in particular to a touch display panel, a drive method, and a touch display apparatus.

BACKGROUND

A touch display panel is a display panel that integrates touch and display. Because the touch display panel can provide a human-computer interactive interface and allow execution of input by using a touch medium such as a finger, the touch display panel is used more directly and is more user-friendly. Therefore, the touch display panel is more widely used in various display apparatuses.

Usually, a touch scanning signal is provided to a touch electrode in the touch display panel, to charge a touch capacitor corresponding to the touch electrode.

However, as a touch sampling rate of the touch display panel is increasingly higher, charging time for the touch capacitor is increasingly shorter. When the charging time for the touch capacitor is short, the capacitor is undercharged, that is, the touch capacitor may not be charged to a target value. This undoubtedly affects sensitivity of touch, and further affects user experience.

SUMMARY

To resolve the foregoing technical problem, this application provides a touch display panel, a drive method, and a touch display apparatus, to improve sensitivity of touch and user experience.

According to a first aspect, an embodiment of this application provides a touch display panel. The touch display panel includes: a plurality of touch electrodes, where the touch electrode is configured to receive a touch scanning signal; and at least one auxiliary electrode, electrically connected to the touch electrode and configured to provide an auxiliary signal to the touch electrode when the touch electrode receives the touch scanning signal, where the auxiliary signal is the same as the touch scanning signal.

By disposing of the auxiliary electrode, when the touch electrode receives the touch scanning signal, the auxiliary electrode further provides the auxiliary signal to the touch electrode receiving the touch scanning signal, to improve charging efficiency. To be specific, although charging time for a capacitor is short, the capacitor may be quickly charged to a target value. This resolves a problem that the capacitor is undercharged when the charging time for the capacitor is short, improving sensitivity of touch. When the touch display panel is used in a device such as a vehicle-mounted device, sensitivity of a corresponding device is improved. This improves safety of a vehicle in use. When the touch display panel is a display apparatus having a game function, sensitivity of the display apparatus is improved. This improves game experience of a user. That the auxiliary signal is the same as the touch scanning signal may mean that a voltage of the auxiliary signal is the same as a voltage of the touch scanning signal.

In some possible implementations, the touch electrode includes a self-capacitance touch electrode. The touch display panel includes N touch areas. Each touch area includes a plurality of self-capacitance touch electrodes. There are N auxiliary electrodes, self-capacitance touch electrodes in a same touch area are electrically connected to a same auxiliary electrode, where N is a positive integer greater than or equal to 1. Because the touch electrode not only receives the touch scanning signal but also receives the auxiliary signal provided by using the auxiliary electrode, the charging efficiency is improved. In addition, because time points when the self-capacitance touch electrodes in the same touch area receive the touch scanning signal are the same, the auxiliary signal may be provided to a plurality of self-capacitance touch electrodes in the same touch area by using one auxiliary electrode. This can improve the charging efficiency and reduce a quantity of disposed auxiliary electrodes. In other words, this can reduce traces and simplifies process steps.

In some possible implementations, on the basis that the touch electrode includes a self-capacitance touch electrode, N auxiliary electrodes are electrically connected. The touch display panel further includes a plurality of switch modules and a plurality of control signal lines. The switch module includes a first end, a second end, and a control end. The self-capacitance touch electrodes in the same touch area are electrically connected to a first end of at least one switch module. Second ends of the plurality of switch modules are all electrically connected to the auxiliary electrodes. A control end of the switch module is electrically connected to the control signal line. The control signal line is configured to send a control signal to the control end of the switch module, to control the switch module to be turned on or turned off. When self-capacitance touch electrodes in an $i^{th}$ touch area receive the touch scanning signal, a switch module electrically connected to the self-capacitance touch electrode in the $i^{th}$ touch area is configured to transmit an auxiliary signal transmitted on the auxiliary electrode to the self-capacitance touch electrode in the $i^{th}$ touch area, i is a positive integer greater than or equal to 1, and i is less than or equal to N. When N auxiliary electrodes are electrically connected, a touch drive chip may provide the auxiliary signal to the auxiliary electrode by using a pin. This reduces a quantity of pins of the touch drive chip that outputs the auxiliary signal, and reduces costs of the touch drive chip.

In some possible implementations, on the basis that N auxiliary electrodes are electrically connected, the plurality of self-capacitance touch electrodes are electrically connected to first ends of the plurality of switch modules in a one-to-one correspondence, that is, one self-capacitance touch electrode is corresponding to one switch module, that is, a quantity of switch modules are the same as a quantity of self-capacitance touch electrodes, and the auxiliary electrode may be configured to separately charge a self-capacitance touch electrode corresponding to the switch module by using the switch module, to further improve the charging efficiency.

In some possible implementations, on the basis that N auxiliary electrodes are electrically connected, when the self-capacitance touch electrodes in the same touch area are electrically connected to first ends of at least two switch modules, control ends of the switch modules electrically connected to the self-capacitance touch electrodes in the $i^{th}$ touch area are electrically connected to a same control signal line, without separately providing one control signal line to each switch module. This reduces the quantity of pins of the touch drive chip that outputs the control signal.

In some possible implementations, the touch electrode includes a mutual-capacitance touch electrode. The mutual-capacitance touch electrode includes L touch drive electrodes and a plurality of touch detection electrodes. L touch drive electrodes extend in a first direction and are arranged in a second direction, and the plurality of touch detection electrodes extend in the second direction and are arranged in the first direction, where the first direction intersects the second direction. There are L auxiliary electrodes, and L is a positive integer greater than or equal to 1. A plurality of auxiliary electrodes are electrically connected to a plurality of touch drive electrodes in a one-to-one correspondence. The auxiliary electrode is configured to provide the auxiliary signal to the touch drive electrode when the touch drive electrode receives the touch scanning signal. Because the touch drive electrode not only receives the touch scanning signal but also receives the auxiliary signal provided by using the auxiliary electrode, the charging efficiency is improved. To be specific, although the charging time for the capacitor is short, the capacitor may be quickly charged to the target value. This resolves a problem that the capacitor is undercharged when the charging time for the capacitor is short.

In some possible implementations, on the basis that the touch electrode includes a mutual-capacitance touch electrode, L auxiliary electrodes are electrically connected. The touch display panel further includes a plurality of switch modules and a plurality of control signal lines. The switch module includes a first end, a second end, and a control end. One touch drive electrode is electrically connected to a first end of at least one switch module. Second ends of the plurality of switch modules are all electrically connected to the auxiliary electrodes. A control end of the switch module is electrically connected to the control signal line. The control signal line is configured to send a control signal to the control end of the switch module, to control the switch module to be turned on or turned off. When a $j^{th}$ touch drive electrode receives the touch scanning signal, a switch module electrically connected to the $j^{th}$ touch drive electrode is configured to transmit an auxiliary signal transmitted on the auxiliary electrode to the $j^{th}$ touch drive electrode, where j is a positive integer greater than or equal to 1, and j is less than or equal to L. When N auxiliary electrodes are electrically connected, a touch drive chip may provide the auxiliary signal to the auxiliary electrode by using a pin. This reduces a quantity of pins of the touch drive chip that outputs the auxiliary signal, and reduces costs of the touch drive chip.

In some possible implementations, on the basis that L auxiliary electrodes are electrically connected, the touch drive electrodes intersect the touch detection electrodes to form a plurality of mutual capacitors, and the plurality of mutual capacitors are electrically connected to first ends of the plurality of switch modules in a one-to-one correspondence. In this way, the auxiliary electrode may be configured to separately charge a mutual capacitor corresponding to the switch module by using the switch module, to further improve the charging efficiency.

In some possible implementations, on the basis that L auxiliary electrodes are electrically connected, when a same touch drive electrode is electrically connected to first ends of at least two switch modules, a control end of the switch module electrically connected to the $j^{th}$ touch drive electrode is electrically connected to a same control signal line. This reduces the quantity of pins of the touch drive chip that outputs the control signal.

In some possible implementations, the control signal line and the auxiliary electrode are disposed at a same layer. Because the control signal lines and auxiliary electrodes are formed with a same material in a same process, processes are reduced, and the display panel is lighter and thinner.

In some possible implementations, on the basis that the touch display panel further includes the switch modules, the switch module includes a first transistor. The switch module includes, but is not limited to, a transistor, provided that a device that can implement an on or off function falls within the protection scope of this application.

In some possible implementations, on the basis that the switch module includes a first transistor, the touch display panel includes a liquid crystal display panel. The liquid crystal display panel includes an array substrate, a color film substrate, and a liquid crystal layer disposed between the array substrate and the color film substrate. The array substrate includes a substrate, a pixel driving circuit disposed on the substrate, and a pixel electrode and a common electrode that are disposed on a side, away from the substrate, of the pixel driving circuit. The pixel driving circuit includes at least one second transistor. The first transistor and the second transistor each include a first electrode, a second electrode, and a gate. The gate of the first transistor, the control signal line, and the gate of the second transistor are disposed at a same layer. The first electrode and the second electrode of the first transistor, and the first electrode and second electrode of the second transistor are disposed at a same layer. The auxiliary electrode and the common electrode are disposed at a same layer. Because the gate of the first transistor, the control signal line, and the gate of the second transistor are formed with a same material in a same process, the first electrode and the second electrode of the first transistor, and the first electrode and the second electrode of the second transistor are formed with a same material in a same process, and the auxiliary electrode and the common electrode are formed with a same material in a same process, processes are reduced. In addition, in comparison that the gate of the first transistor, the control signal line, and the gate of the second transistor are separately disposed at different film layers, the first electrode and the second electrode of the first transistor, and the first electrode and the second electrode of the second transistor are separately disposed at different film layers, and the auxiliary electrode and the common electrode are separately disposed at different film layers, in this embodiment of this application, the gate of the first transistor, the control signal line, and the gate of the second transistor are disposed at a same layer, the first electrode and the second electrode of the first transistor, and the first electrode and the second electrode of the second transistor are disposed at a same film layer, and the auxiliary electrode and the common electrode are disposed at a same layer. Therefore, an overall thickness of the touch display panel is reduced, and the touch display panel is lighter and thinner.

In some possible implementations, on the basis that the switch module includes a first transistor, the touch display panel includes an organic light emitting diode display panel. The organic light emitting diode display panel includes a substrate, a pixel circuit layer disposed on the substrate, and a light emitting layer disposed on a side, away from the substrate, of the pixel circuit layer. The pixel circuit layer includes a plurality of pixel driving circuits. The pixel driving circuit includes at least one second transistor. The light emitting layer includes an anode located on the side, away from the substrate, of the pixel circuit layer, a light emitting functional layer located on a side, away from the substrate, of the anode, and a cathode located on a side, away from the anode, of the light emitting functional layer. The first transistor and the second transistor each include a first electrode, a second electrode, and a gate. The gate of the first transistor, the control signal line, and the gate of the second transistor are disposed at a same layer. The first electrode and the second electrode of the first transistor, and the first electrode and second electrode of the second transistor are disposed at a same layer. The auxiliary electrode and the cathode are disposed at a same layer. Because the gate of the first transistor, the control signal line, and the gate of the second transistor are formed with a same material in a same process, the first electrode and the second electrode of the first transistor, and the first electrode and the second electrode of the second transistor are formed with a same material in a same process, and the auxiliary electrode and the cathode are formed with a same material in a same process, processes are reduced. In addition, in comparison that the gate of the first transistor, the control signal line, and the gate of the second transistor are separately disposed at different film layers, the first electrode and the second electrode of the first transistor, and the first electrode and the second electrode of the second transistor are separately disposed at different film layers, and the auxiliary electrode and a transparent cathode are separately disposed at different film layers, in this embodiment of this application, the gate of the first transistor, the control signal line, and the gate of the second transistor are disposed at a same layer, the first electrode and the second electrode of the first transistor, and the first electrode and the second electrode of the second transistor are disposed at a same film layer, and the auxiliary electrode and the cathode are disposed at a same layer. Therefore, an overall thickness of the touch display panel is reduced, and the touch display panel is lighter and thinner.

According to a second aspect, an embodiment of this application provides a touch display apparatus. The touch display apparatus includes the touch display panel according to any one of the foregoing implementations, to implement all effects of the foregoing touch display panel.

According to a third aspect, an embodiment of this application provides a drive method for a touch display panel. The drive method for a touch display panel is applied to the touch display panel according to any one of the foregoing implementations, to implement all effects of the foregoing touch display panel.

The drive method for a touch display panel includes: sending a touch scanning signal to a to-be-scanned touch electrode, and sending an auxiliary signal to an auxiliary electrode, to send the auxiliary signal to the to-be-scanned touch electrode by using the auxiliary electrode, where the to-be-scanned touch electrode is a touch electrode receiving the touch scanning signal.

For example, when the touch electrode includes a self-capacitance touch electrode, the touch display panel includes four touch areas. The four touch areas include a first touch area, a second touch area, a third touch area, and a fourth touch area. When a touch drive chip provides the touch scanning signal to a plurality of touch electrodes in the first touch area, the plurality of touch electrodes in the first touch area are to-be-scanned touch electrodes. When the touch drive chip provides the touch scanning signal to a plurality of touch electrodes in the second touch area, the plurality of touch electrodes in the second touch area are to-be-scanned touch electrodes. When a touch drive chip provides the touch scanning signal to a plurality of touch electrodes in the third touch area, the plurality of touch electrodes in the third touch area are to-be-scanned touch electrodes. When a touch drive chip provides the touch scanning signal to a plurality of touch electrodes in the fourth touch area, the plurality of touch electrodes in the fourth touch area are to-be-scanned touch electrodes.

For example, when the touch electrode includes a mutual-capacitance touch electrode, the mutual-capacitance touch electrode includes four touch drive electrodes and a plurality of touch detection electrodes. The four touch drive electrodes include a first touch drive electrode, a second touch drive electrode, a third touch drive electrode, and a fourth touch drive electrode. When the touch drive chip provides the touch scanning signal to the first touch drive electrode, the first touch drive electrode is a to-be-scanned touch electrode. When the touch drive chip provides the touch scanning signal to the second touch drive electrode, the second touch drive electrode is a to-be-scanned touch electrode. When the touch drive chip provides the touch scanning signal to the third touch drive electrode, the third touch drive electrode is a to-be-scanned touch electrode. When the touch drive chip provides the touch scanning signal to the fourth touch drive electrode, the fourth touch drive electrode is a to-be-scanned touch electrode.

In some possible implementations, the touch electrode includes a self-capacitance touch electrode. The touch display panel includes N touch areas. Each touch area includes a plurality of self-capacitance touch electrodes. There are N auxiliary electrodes, self-capacitance touch electrodes in a same touch area are electrically connected to a same auxiliary electrode.

The sending a touch scanning signal to a to-be-scanned touch electrode, and sending an auxiliary signal to an auxiliary electrode includes: sending the touch scanning signal to a self-capacitance touch electrode in an $i^{th}$ touch area, and sending the auxiliary signal to an auxiliary electrode electrically connected to the self-capacitance touch electrode in the $i^{th}$ touch area; and cyclically performing the foregoing steps until scanning of self-capacitance touch electrodes in N touch areas is completed, where i and N are positive integers greater than or equal to 1, and i is less than or equal to N.

In some possible implementations, on the basis that the touch electrode includes a self-capacitance touch electrode, N auxiliary electrodes are electrically connected. The touch display panel further includes a plurality of switch modules and a plurality of control signal lines. The switch module includes a first end, a second end, and a control end. The self-capacitance touch electrodes in the same touch area are electrically connected to a first end of at least one switch module. Second ends of the plurality of switch modules are all electrically connected to the auxiliary electrodes. A control end of the switch module is electrically connected to the control signal line.

When sending the touch scanning signal to a self-capacitance touch electrode in an $i^{th}$ touch area, and sending the auxiliary signal to an auxiliary electrode electrically connected to the self-capacitance touch electrode in the $i^{th}$ touch area, the method further includes: sending a control signal to an $i^{th}$ control signal line, to enable a switch module electrically connected to the $i^{th}$ control signal line to be turned on, where the $i^{th}$ control signal line is a control signal line electrically connected to a control end of a switch module corresponding to the $i^{th}$ touch area.

In some possible implementations, the touch electrode includes a mutual-capacitance touch electrode. The mutual-capacitance touch electrode includes L touch drive electrodes and a plurality of touch detection electrodes. L touch drive electrodes extend in a first direction and are arranged in a second direction, and the plurality of touch detection electrodes extend in the second direction and are arranged in the first direction, where the first direction intersects the second direction. There are L auxiliary electrodes, and L is a positive integer greater than or equal to 1. L auxiliary electrodes are electrically connected to L touch drive electrodes in a one-to-one correspondence. The sending a touch scanning signal to a to-be-scanned touch electrode, and sending an auxiliary signal to an auxiliary electrode includes: sending the touch scanning signal to a $j^{th}$ touch drive electrode, and sending the auxiliary signal to an auxiliary electrode electrically connected to the $j^{th}$ touch drive electrode; and cyclically performing the foregoing steps until scanning of L touch drive electrodes is completed, where j and L are positive integers greater than or equal to 1, and j is less than or equal to L.

In some possible implementations, on the basis that the touch electrode includes a mutual-capacitance touch electrode, L auxiliary electrodes are electrically connected. The touch display panel further includes a plurality of switch modules and a plurality of control signal lines. The switch module includes a first end, a second end, and a control end. One touch drive electrode is electrically connected to a first end of at least one switch module. Second ends of the plurality of switch modules are all electrically connected to the auxiliary electrodes. A control end of the switch module is electrically connected to the control signal line.

When sending the touch scanning signal to a $j^{th}$ touch drive electrode, and sending the auxiliary signal to an auxiliary electrode electrically connected to the $j^{th}$ touch drive electrode, the method further includes: sending a control signal to a $j^{th}$ control signal line, to enable a switch module electrically connected to the $j^{th}$ control signal line to be turned on, where the $j^{th}$ control signal line is a control signal line electrically connected to a control end of a switch module corresponding to the $j^{th}$ touch drive electrode.

DESCRIPTION OF EMBODIMENTS

The following clearly and completely describes technical solutions in embodiments of this application with reference to accompanying drawings in embodiments of this application. Clearly, the described embodiments are some rather than all of embodiments of this application. All other embodiments obtained by a person of ordinary skill in the art based on embodiments of this application without creative efforts shall fall within the protection scope of this application.

In this specification, the term "and/or" is merely an association relationship that describes associated objects, and represents that there may be three relationships. For example, A and/or B may represent three cases: only A exists, both A and B exist, and only B exists.

In the specification and the claims of embodiments of this application, terms such as "first" and "second" are used to distinguish between different objects, but are not used to describe a particular sequence of the objects. For example, a first target object, a second target object, and the like are used to distinguish between different target objects, but are not used to describe a particular order of the target objects.

In embodiments of this application, words such as "example" or "for example" are used to represent giving an example, an illustration, or a description. Any embodiment or design solution described as "example" or "for example" in embodiments of this application should not be construed as being more preferred or advantageous than other embodiments or design solutions. Exactly, use of the word such as "example" or "for example" is intended to present a related concept in a specific manner.

In the description of embodiments of this application, unless otherwise specified, the meaning of "a plurality of" means two or more. For example, "a plurality of processing units" means two or more processing units, and "a plurality of systems" means two or more systems.

Figure 1:
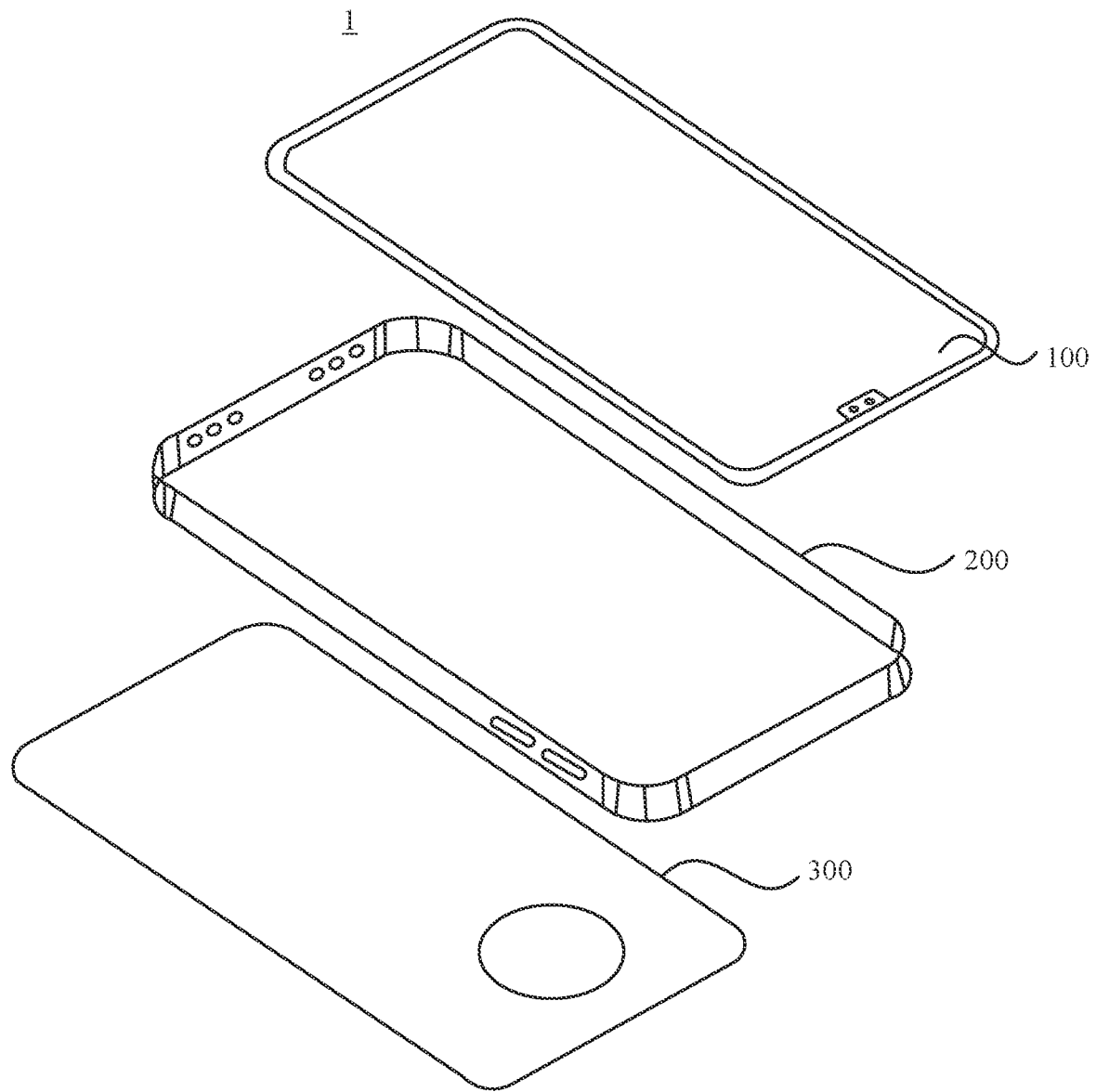
FIG. 1 is a schematic diagram of a structure of a touch display apparatus according to an embodiment of this application.

An embodiment of this application provides a touch display apparatus. The touch display apparatus provided in this embodiment of this application may be a display apparatus that may enable a touch function, such as a television, a tablet computer, a personal digital assistant (PDA), a vehicle-mounted computer, a mobile phone, a smart wearable device, a smart home device, or the like. A specific form of the touch display apparatus is not particularly limited in this embodiment of this application. As shown in FIG. 1, for ease of description, an example in which the touch display apparatus is a mobile phone is used below for description.

As shown in FIG. 1, a mobile phone 1 includes a touch display panel 100, a middle frame 200, and a rear housing 300. The touch display panel 100 may be, for example, a liquid crystal display (LCD) panel, an organic light emitting diode (OLED) display panel, and an LED display panel. The LED display panel includes, for example, a Micro-LED display panel, a Mini-LED display panel, or the like. A type of the touch display panel 100 is not limited in this embodiment of this application.

Figure 2:
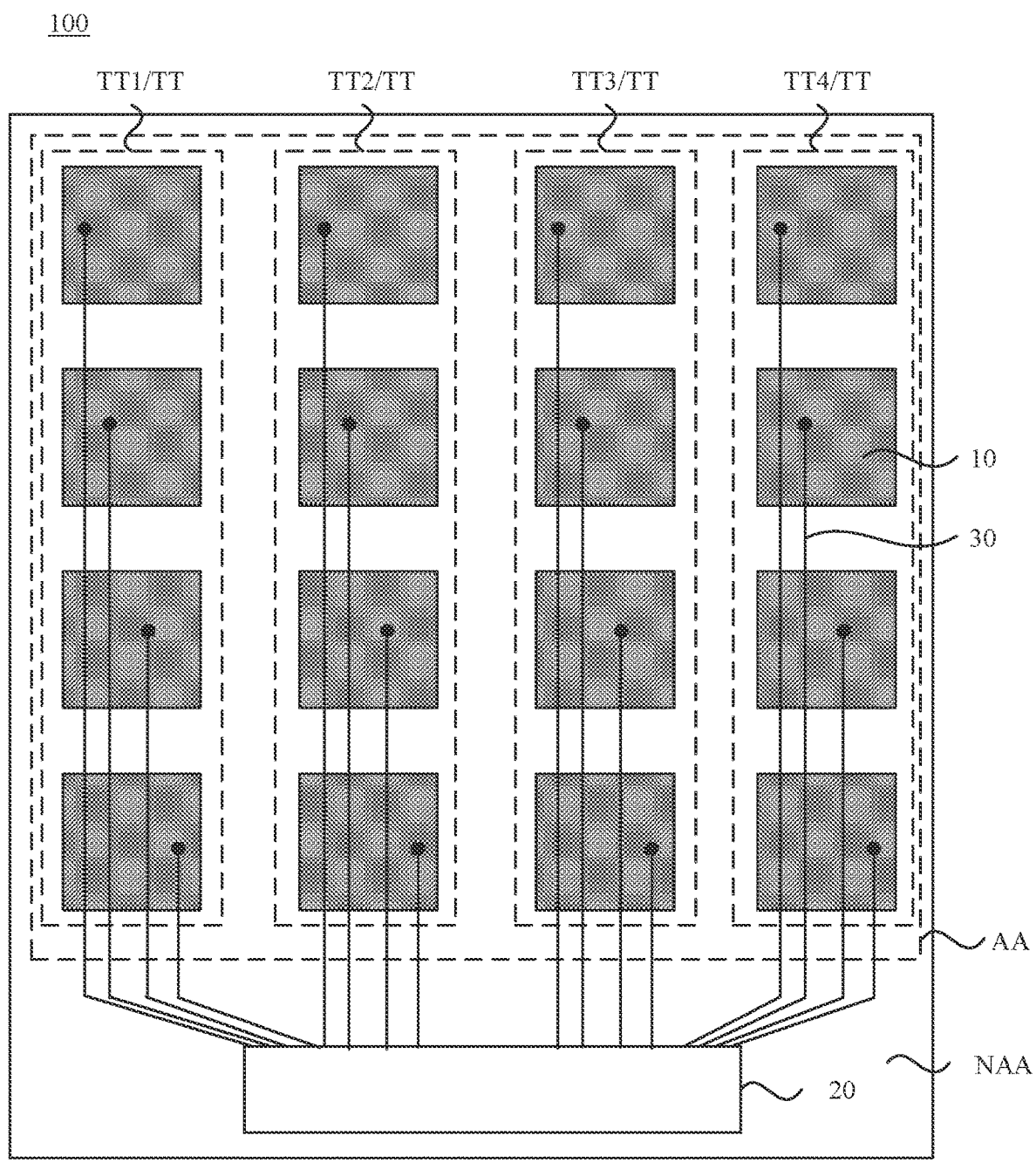
FIG. 2 is a schematic diagram of a structure of a touch display panel according to an embodiment of this application.

As shown in FIG. 2, a touch display panel 100 includes, for example, a display area AA and a non-display area NAA. The display area AA includes a plurality of touch areas TT. The touch display panel 100 further includes a plurality of touch electrodes 10 disposed in the touch area TT. A self-capacitor is formed between the touch electrode 10 and a ground. When a finger touches the touch display panel 100, an external capacitor formed by a touch of the finger changes capacitance of the self-capacitor formed between the touch electrode 10 and the ground. When the capacitance of the self-capacitor is detected, a touch drive chip 20 located in the non-display area NAA provides a touch scanning signal to touch electrodes 10 in different touch areas TT at different time points through touch traces 30. For example, the plurality of touch areas TT include a first touch area TT1, a second touch area TT2, a third touch area TT3, and a fourth touch area TT4. In a touch frame, scanning of all touch electrodes 10 in the four touch areas TT in the touch display panel 100 are to be completed. Specifically, at a first time point, the touch scanning signal is provided to a plurality of touch electrodes 10 in the first touch area TT1; at a second time point, the touch scanning signal is provided to a plurality of touch electrodes 10 in the second touch area TT2; at a third time point, the touch scanning signal is provided to a plurality of touch electrodes 10 in the third touch area TT3; and at a fourth time point, the touch scanning signal is provided to a plurality of touch electrodes 10 in the fourth touch area TT4. The touch drive chip 20 receives a touch detection signal fed back from the touch electrode 10 through the touch trace 30, and determines a touch position based on the touch detection signal.

It should be noted that the touch drive chip 20 may be disposed on the touch display panel 100, may not be disposed on the touch display panel 100, or may alternatively be disposed at another position of the mobile phone 1. A position of the touch drive chip 20 is not limited in this embodiment of this application. In addition, the touch drive chip 20 and a display drive chip may be integrated in a chip, or may be separately disposed. This is not limited in this embodiment of this application. In this embodiment of this application, an example in which the touch drive chip 20 is disposed on the touch display panel 100 and the touch drive chip 20 and the display drive chip are integrated in a chip is used below for description.

It should be further noted that, the foregoing example in which the touch electrode 10 in the touch display panel 100 is a self-capacitance touch electrode is used for description, and does not constitute a limitation on this application. In another optional embodiment of this application, the touch electrode 10 may alternatively be a mutual-capacitance touch electrode.

Figure 3:
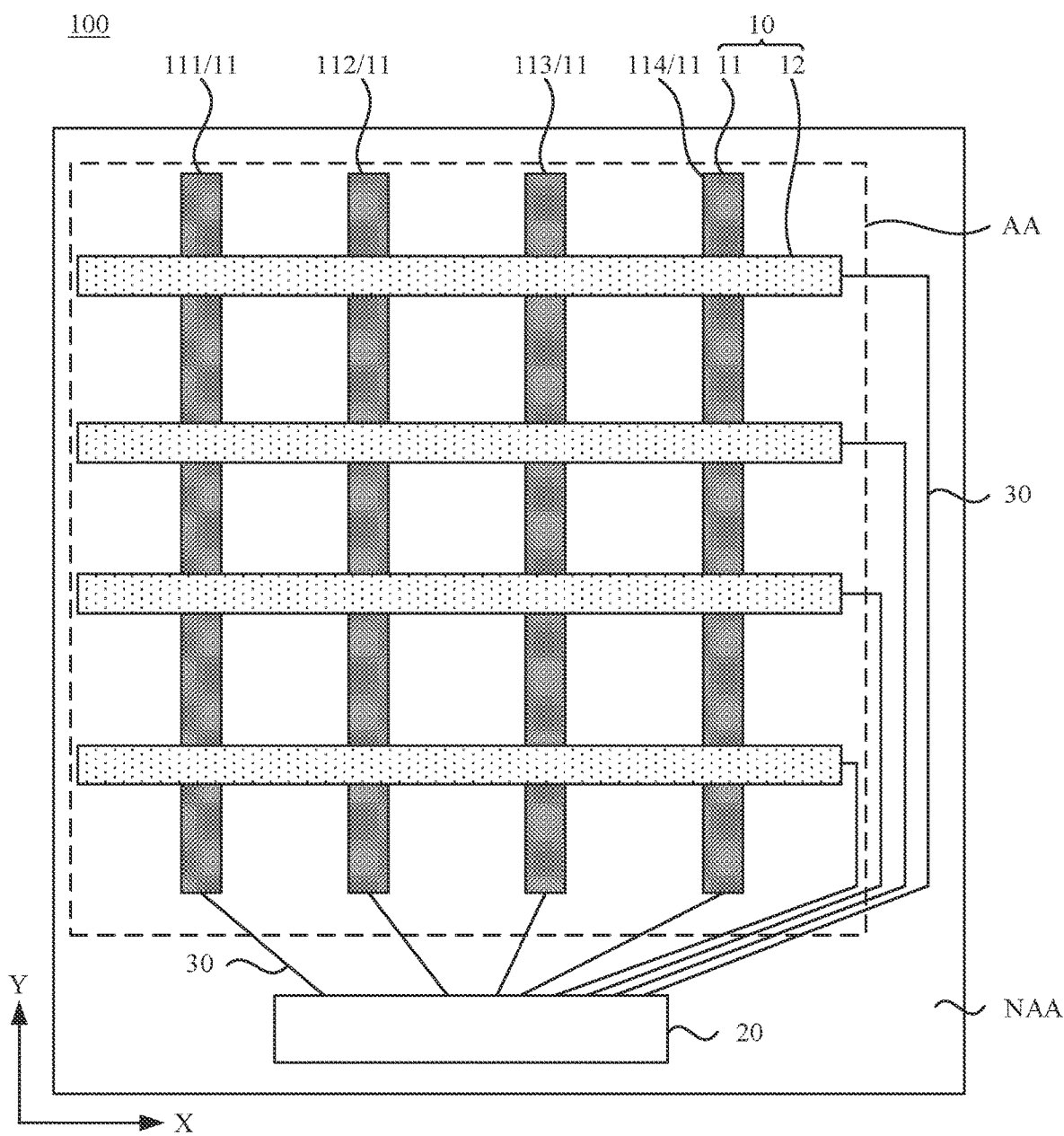
FIG. 3 is a schematic diagram of another structure of a touch display panel according to an embodiment of this application.

For example, refer to FIG. 3. A touch electrode 10 includes a mutual-capacitance touch electrode. The mutual-capacitance touch electrode includes a plurality of touch drive electrodes 11 and a plurality of touch detection electrodes 12. The plurality of touch drive electrodes 11 extend in a first direction and are arranged in a second direction. The plurality of touch detection electrodes 12 extend in the second direction and are arranged in the first direction. The first direction may be, for example, a Y direction, the second direction may be, for example, an X direction. For example, the X direction and the Y direction are perpendicular to each other. Projections of the touch drive electrodes 11 and projections of the touch detection electrodes 12 are overlapped, and a mutual capacitor may be formed at an intersection of two groups of electrodes. When a finger touches a touch display panel 100, an electrical connection between two electrodes near a touch point is affected. This changes capacitance between the two electrodes. When capacitance of the mutual capacitor is detected, a touch scanning signal is to be sent to the touch drive electrodes 11 in sequence. For example, the plurality of touch drive electrodes 11 includes a first touch drive electrode 111, a second touch drive electrode 112, a third touch drive electrode 113, and a fourth touch drive electrode 114. In a touch frame, scanning of four touch drive electrodes 11 in the touch display panel 100 is to be completed. Specifically, at a first time point, the touch scanning signal is provided to the first touch drive electrode 111; at a second time point, the touch scanning signal is provided to the second touch drive electrode 112; at a third time point, the touch scanning signal is provided to the third touch drive electrode 113; and at a fourth time point, the touch scanning signal is provided to the fourth touch drive electrode 114. A touch drive chip 20 receives a touch detection signal fed back from the touch detection electrode 12 through a touch trace 30, and determines a touch position based on the touch detection signal.

Figure 4:
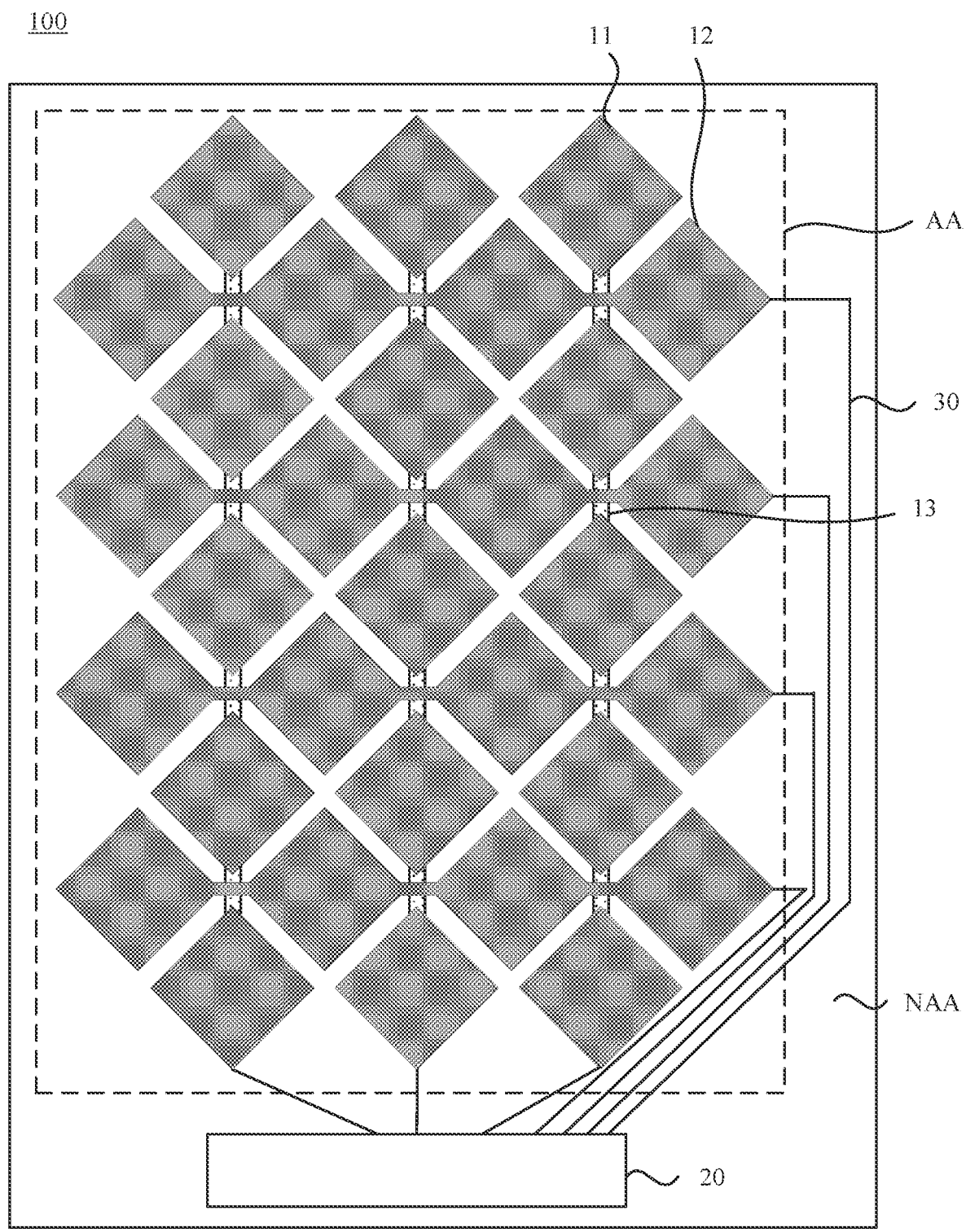
FIG. 4 is a schematic diagram of another structure of a touch display panel according to an embodiment of this application.

When the touch electrode 10 is the mutual-capacitance touch electrode, as shown in FIG. 3, the touch drive electrodes 11 and the touch detection electrodes 12 may be located in different film layers. Alternatively, refer to FIG. 4. The touch drive electrodes 11 and the touch detection electrodes 12 are disposed in a same film layer, and an electrical connection between the touch drive electrodes 11 is implemented through a cross-bridge structure 13. When the touch drive electrodes 11 and the touch detection electrodes are disposed in the same film layer, a principle of detection is the same as a principle of detection when the touch drive electrodes 11 and the touch detection electrodes 12 are disposed in different film layers. Details are not described herein again.

It should be noted that, when the touch electrode 10 is a self-capacitance touch electrode, a position at which the touch trace 30 is disposed is not limited in this embodiment of this application, provided that an electrical connection between the touch electrode 10 and a touch drive chip 20 may be implemented through the touch trace 30. For example, the touch trace 30 is electrically connected to the touch electrode 10 by routing on a side of the touch drive chip 20. Similarly, when the touch electrode 10 is the mutual-capacitance touch electrode, a position at which the touch trace 30 is electrically connected to the touch drive electrode 11 and a position at which the touch trace 30 is electrically connected to the touch detection electrode 12 are not limited in this embodiment of this application, provided that an electrical connection between the touch drive electrode 10 and the touch drive chip 20 may be implemented through the touch trace 30 and an electrical connection between the touch detection electrode 12 and the touch drive chip 20 may be implemented through the touch trace 30. For example, some of the touch traces 30 route along a non-display area NAA of the display panel 100 from the touch drive chip 20 and are electrically connected to the touch detection electrodes 12, and some of touch traces 30 route on the side of the touch drive chip 20 from the touch drive chip 20 and are electrically connected to the touch drive electrodes 11. Alternatively, some of the touch traces 30 route on an opposite side of the touch drive chip 20 from the touch drive chip 20 and are electrically connected to the touch drive electrodes 11.

It should be noted that, when the touch electrode 10 is the mutual-capacitance touch electrode, an example in which the touch drive electrodes 11 and the touch detection electrodes 12 are located in the different film layers is used below for description.

Figure 5:
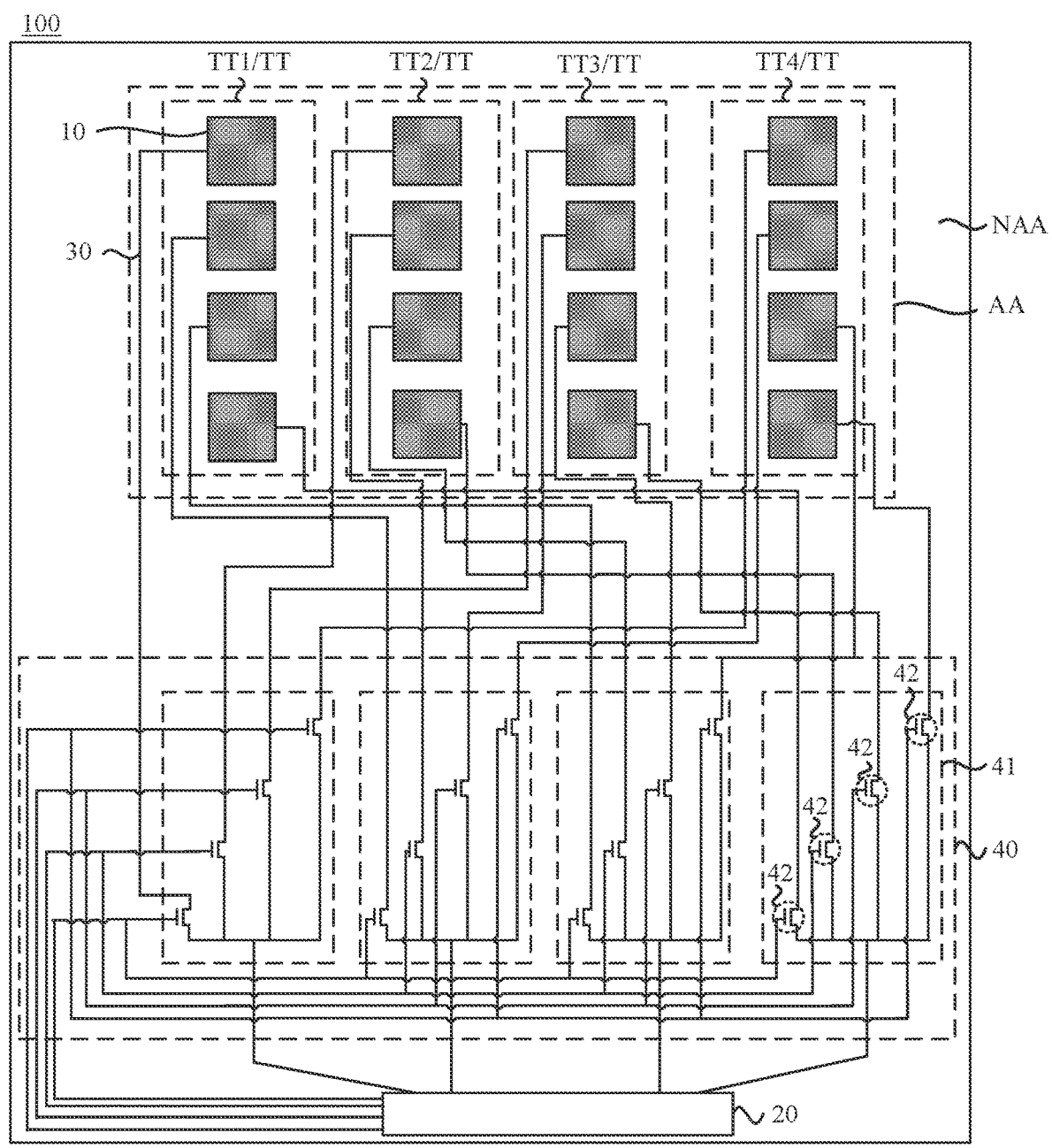
FIG. 5 is a schematic diagram of another structure of a touch display panel according to an embodiment of this application.

In addition, refer to FIG. 5. The touch display panel 100 provided in an embodiment of this application further includes a multiplexing circuit 40. The multiplexing circuit 40 includes, for example, four multiplexing selection units 41. The four multiplexing selection units 41 each include, for example, four transistors 42. Transistors 42 located in a first row in the four multiplexing selection units 41 are electrically connected to touch electrodes 10 in a first touch area TT1 respectively, transistors 42 located in a second row in the four multiplexing selection units 41 are electrically connected to touch electrodes 10 in a second touch area TT2 respectively, transistors 42 located in a third row in the four multiplexing selection units 41 are electrically connected to touch electrodes 10 in a third touch area TT3 respectively, and transistors 42 located in a fourth row in a four multiplexing selection units 41 are electrically connected to touch electrodes 10 in a fourth touch area TT4 respectively. Because an input end of one multiplexing selection unit 41 is electrically connected to a pin of a touch drive chip 20, a quantity of pins of the touch drive chip 20 may be reduced due to disposing of the multiplexing circuit 40.

It should be noted that an example in which no multiplexing circuit 40 is disposed in the touch display panel 100 is used below for description.

To resolve the problem in the Background, the touch display panel provided in this embodiment of this application further includes an auxiliary electrode. When a capacitor (a self-capacitor or a mutual capacitor) is to be charged, a touch electrode receives a touch scanning signal, and the auxiliary electrode further provides an auxiliary signal to the touch electrode, to improve charging efficiency. Even if charging time for the capacitor is short, the capacitor may be quickly charged to a target value. This resolves a problem that the capacitor is undercharged when the charging time for the capacitor is short, improving sensitivity of touch. When the touch display panel is used in a device such as a vehicle-mounted device, sensitivity of a corresponding device is improved. This improves safety of a vehicle in use. When the touch display panel is a display apparatus having a game function, sensitivity of the display apparatus is improved. This improves game experience of a user.

The auxiliary signal and the touch scanning signal may be the same, for example. That the auxiliary signal is the same as the touch scanning signal may mean that a voltage of the auxiliary signal is the same as a voltage of the touch scanning signal, for example, the voltage of the auxiliary signal and the voltage of the touch scanning signal are both 5V.

If the voltage of the auxiliary signal is the same as the voltage of the touch scanning signal, the following cases may be prevented: when the auxiliary signal is smaller than the touch scanning signal, a touch scanning signal received by using the touch electrode is reduced by using the auxiliary signal provided by using the auxiliary electrode: or when the auxiliary signal is greater than the touch scanning signal, the auxiliary signal is transmitted to the touch electrode, and the auxiliary signal prevents a touch drive chip from outputting the touch scanning signal to the touch electrode. This affects scanning of the touch electrode. It may be understood that the auxiliary signal being the same as the touch scanning signal includes that the auxiliary signal is the same as the touch scanning signal in a specific error range. To be specific, when the voltage of the auxiliary signal is 10V and the voltage of the touch scanning signal is 10.1V, it is determined that the auxiliary signal is the same as the touch scanning signal.

In addition, to prevent the auxiliary electrode from blocking light emitted from a sub-pixel, a material of the auxiliary electrode includes, for example, indium tin oxide (ITO). It should be noted that the material of the auxiliary electrode includes, but is not limited to, ITO, provided that transmission of the light may not be affected and the auxiliary signal may be transmitted within the protection scope of this application.

An example in which the touch electrode 10 is a mutual-capacitance touch electrode and the touch electrode 10 is a self-capacitance touch electrode is used below for a detailed description separately.

Figure 6:
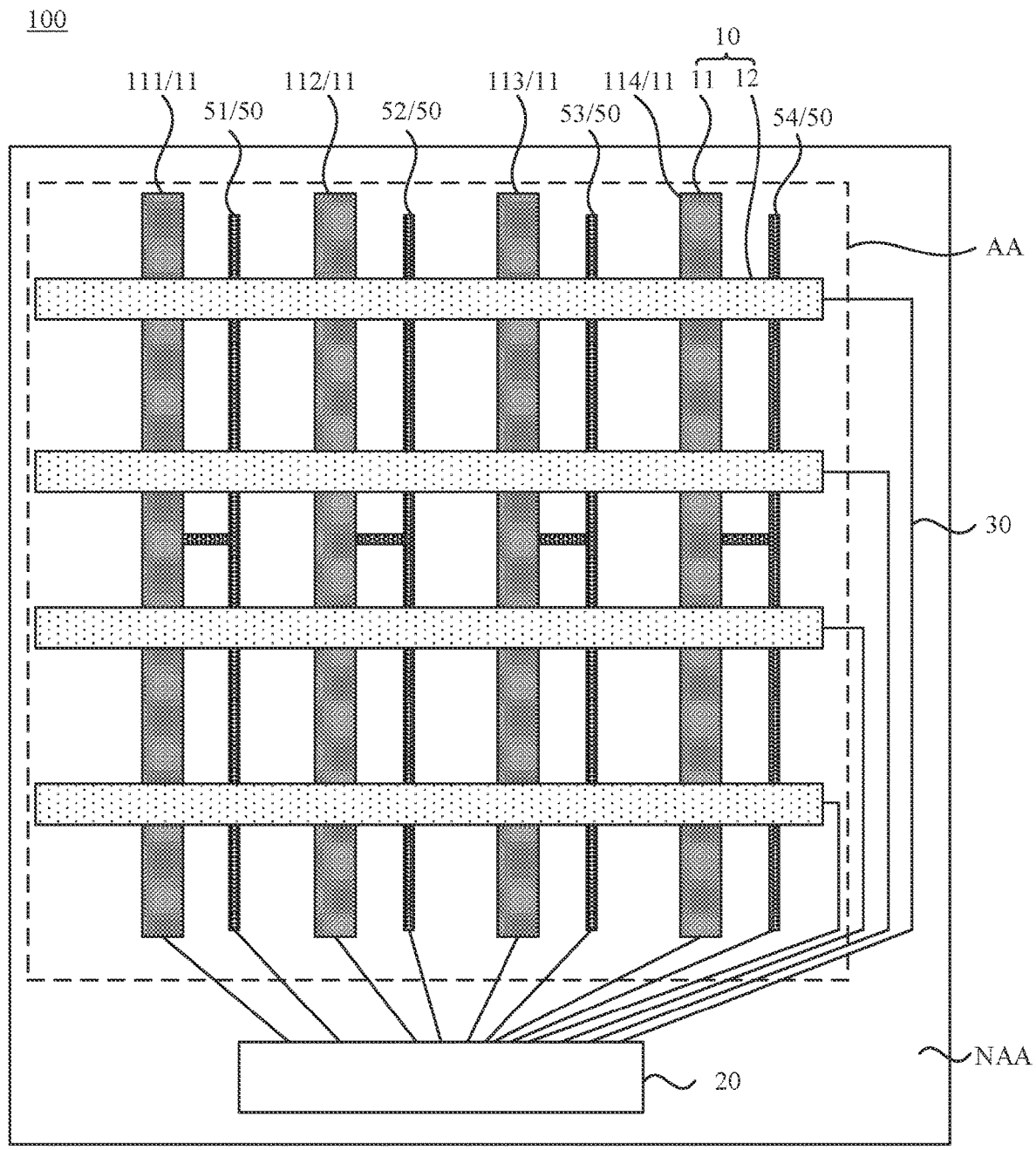
FIG. 6 is a schematic diagram of another structure of a touch display panel according to an embodiment of this application.

Refer to FIG. 6. A touch electrode 10 is the mutual-capacitance touch electrode. A touch display panel 100 includes a plurality of auxiliary electrodes 50. The auxiliary electrodes 50 are configured to receive an auxiliary signal sent by a touch drive chip 20. One touch drive electrode 11 is electrically connected to one auxiliary electrode 50. For example, when a plurality of touch drive electrodes 11 include a first touch drive electrode 111, a second touch drive electrode 112, a third touch drive electrode 113, and a fourth touch drive electrode 114, there are, for example, four auxiliary electrodes 50. The four auxiliary electrodes 50 include a first auxiliary electrode 51, a second auxiliary electrode 52, a third auxiliary electrode 53, and a fourth auxiliary electrode 54. The first touch drive electrode 111 is electrically connected to the first auxiliary electrode 51. The second touch drive electrode 112 is electrically connected to the second auxiliary electrode 52. The third touch drive electrode 113 is electrically connected to the third auxiliary electrode 53. The fourth touch drive electrode 114 is electrically connected to the fourth auxiliary electrode 54.

In a touch frame, scanning of four touch drive electrodes 11 in the touch display panel 100 is to be completed. Specifically, at a first time point, the touch drive chip 20 provides a touch scanning signal to the first touch drive electrode 111 through a touch trace 30, and provides the auxiliary signal to the first touch drive electrode 111 by using the first auxiliary electrode 51. To be specific, a mutual capacitor corresponding to the first touch drive electrode 111 is charged. In addition, the touch drive chip 20 provides a non-touch scanning signal to the second touch drive electrode 112, the third touch drive electrode 113, and the fourth touch drive electrode 114 through the touch trace 30, and the second auxiliary electrode 52, the third auxiliary electrode 53, and the fourth auxiliary electrode 54 do not provide an auxiliary signal to the second touch drive electrode 112, the third touch drive electrode 113, and the fourth touch drive electrode 114. To be specific, mutual capacitors that are respectively corresponding to the second touch drive electrode 112, the third touch drive electrode 113, and the fourth touch drive electrode 114 are discharged. The touch scanning signal may be, for example, a high level, and the non-touch scanning signal may be, for example, a low level. At a second time point, the touch drive chip 20 provides the touch scanning signal to the second touch drive electrode 112, and provides the auxiliary signal to the second touch drive electrode 112 by using the second auxiliary electrode 52. To be specific, a mutual capacitor corresponding to the second touch drive electrode 112 is charged. In addition, the touch drive chip 20 provides the non-touch scanning signal to the first touch drive electrode 111, the third touch drive electrode 113, and the fourth touch drive electrode 114 through the touch trace 30, and the first auxiliary electrode 51, the third auxiliary electrode 53, and the fourth auxiliary electrode 54 do not provide the auxiliary signal to the first touch drive electrode 111, the third touch drive electrode 113, and the fourth touch drive electrode 114. To be specific, mutual capacitors that are respectively corresponding to the first touch drive electrode 111, the third touch drive electrode 113, and the fourth touch drive electrode 114 are discharged. At a third time point, the touch drive chip 20 provides the touch scanning signal to the third touch drive electrode 113, and provides the auxiliary signal to the third touch drive electrode 113 by using the third auxiliary electrode 53. To be specific, a mutual capacitor corresponding to the third touch drive electrode 113 is charged. In addition, the touch drive chip 20 provides the non-touch scanning signal to the first touch drive electrode 111, the second touch drive electrode 112, and the fourth touch drive electrode 114 through the touch trace 30, and the first auxiliary electrode 51, the second auxiliary electrode 52, and the fourth auxiliary electrode 54 do not provide the auxiliary signal to the first touch drive electrode 111, the second touch drive electrode 112, and the fourth touch drive electrode 114. To be specific, mutual capacitors that are respectively corresponding to the first touch drive electrode 111, the second touch drive electrode 112, and the fourth touch drive electrode 114 are discharged. At a fourth time point, the touch drive chip 20 provides the touch scanning signal to the fourth touch drive electrode 114, and provides the auxiliary signal to the fourth touch drive electrode 114 by using the fourth auxiliary electrode 54. To be specific, a mutual capacitor corresponding to the third touch drive electrode 113 is charged. In addition, the touch drive chip 20 provides the non-touch scanning signal to the first touch drive electrode 111, the second touch drive electrode 112, and the third touch drive electrode 113 through the touch trace 30, and the first auxiliary electrode 51, the second auxiliary electrode 52, and the third auxiliary electrode 53 do not provide the auxiliary signal to the first touch drive electrode 111, the second touch drive electrode 112, and the third touch drive electrode 113. To be specific, mutual capacitors that are respectively corresponding to the first touch drive electrode 111, the second touch drive electrode 112, and the third touch drive electrode 113 are discharged. The touch drive chip 20 receives a touch detection signal fed back from a touch detection electrode 12 through the touch trace 30, and determines a touch position based on the touch detection signal. Because the touch drive electrode 11 not only receives the touch scanning signal but also receives the auxiliary signal provided by using the auxiliary electrode 50, charging efficiency is improved. To be specific, although charging time for a capacitor is short, the capacitor may be quickly charged to a target value. This resolves a problem that the capacitor is undercharged when charging time for the capacitor is short.

Figure 7:
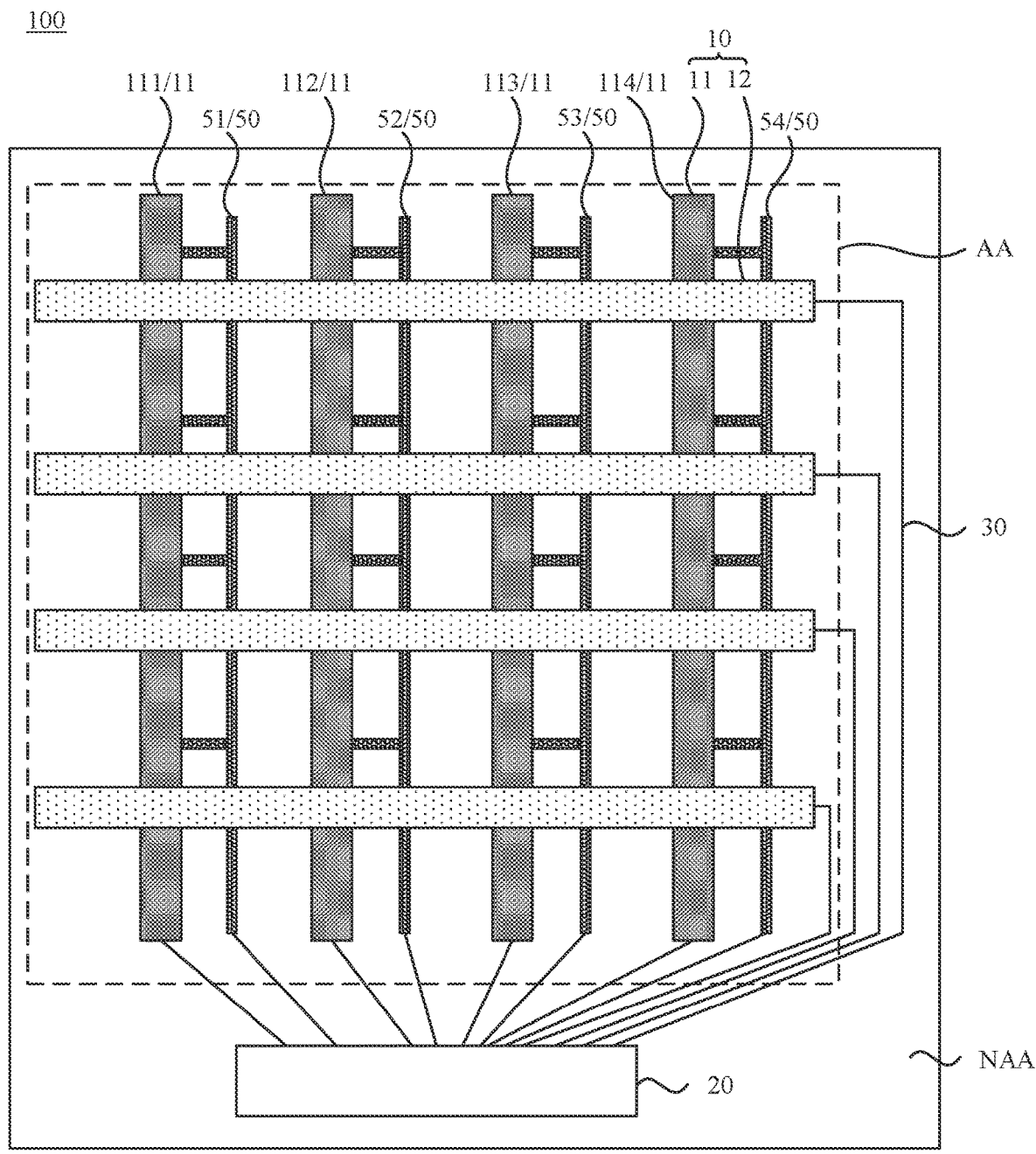
FIG. 7 is a schematic diagram of another structure of a touch display panel according to an embodiment of this application.

To further improve the charging efficiency, refer to FIG. 7. A mutual capacitor formed at an intersection of a touch drive electrode 11 and a touch detection electrode 12 is electrically connected to an auxiliary electrode 50, and a mutual capacitor corresponding to the touch drive electrode 11 is separately charged by using the auxiliary electrode 50. This improves charging efficiency of the mutual capacitor.

Figure 8:
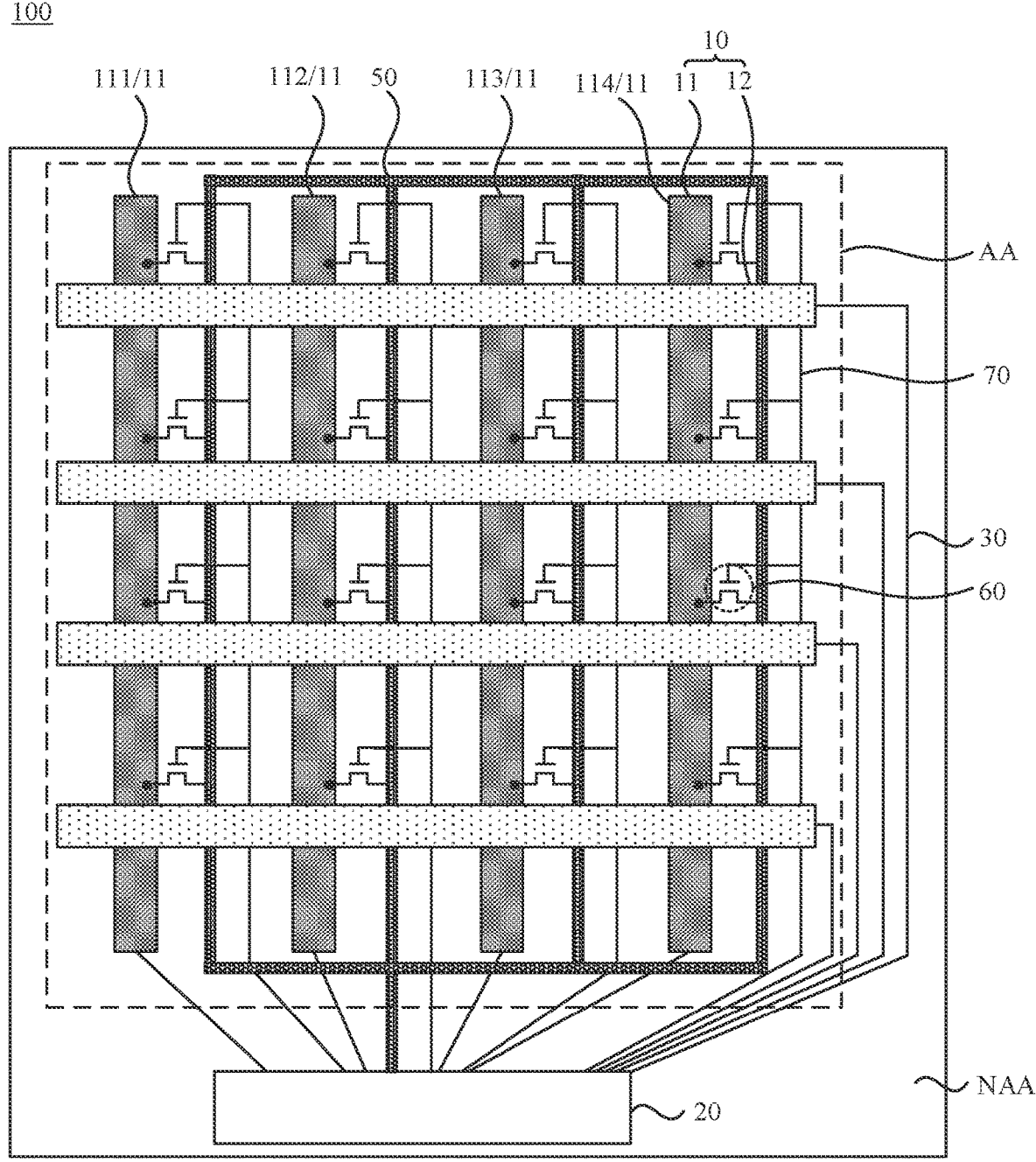
FIG. 8 is a schematic diagram of another structure of a touch display panel according to an embodiment of this application.

In addition, to reduce a quantity of pins of a touch drive chip 20 that outputs an auxiliary signal, refer to FIG. 8. A plurality of auxiliary electrodes 50 are electrically connected to each other, for example, the plurality of auxiliary electrodes 50 form a grid. The touch display panel 100 also includes a plurality of switch modules 60 and a plurality of control signal lines 70. The switch module 60 includes a control end, a first end, and a second end. One touch drive electrode 11 is corresponding to at least one switch module 60. For example, one touch drive electrode 11 is corresponding to four switch modules 60. First ends of the four switch modules 60 are electrically connected to a same touch drive electrode 11, second ends of the four switch modules 60 are electrically connected to a same auxiliary electrode 50, and control ends of the four switch modules 60 are electrically connected to a same control signal line 70. Therefore, control signals sent by using the touch drive chip 20 are obtained through the control signal line 70, to control the switch modules 60 to be turned on or turned off.

In a touch frame, scanning of four touch drive electrodes 11 in the touch display panel 100 is to be completed. Specifically, at a first time point, the touch drive chip 20 provides a touch scanning signal to a first touch drive electrode 111 through a touch trace 30, and provides the control signal to a control end of the switch module 60 corresponding to the first touch drive electrode 111 through the control signal line 70, the switch module 60 is turned on, and an auxiliary signal transmitted by using the first auxiliary electrode 51 provides an auxiliary signal to the first touch drive electrode 111 by using the conductive switch module 60. To be specific, a mutual capacitor corresponding to the first touch drive electrode 111 is charged. In addition, the touch drive chip 20 provides a non-touch scanning signal to the second touch drive electrode 112, the third touch drive electrode 113, and the fourth touch drive electrode 114 through the touch trace 30, and provides the control signal to control ends of the switch modules 60 corresponding to the second touch drive electrode 112, the third touch drive electrode 113, and the fourth touch drive electrode 114, to enable the switch module 60 to be turned off. To be specific, mutual capacitors that are respectively corresponding to the second touch drive electrode 112, the third touch drive electrode 113, and the fourth touch drive electrode 114 are discharged. At a second time point, the touch drive chip 20 provides the touch scanning signal to the second touch drive electrode 112 through the touch trace 30, and provides the control signal to the control end of the switch module 60 corresponding to the second touch drive electrode 112 through the control signal line 70, the switch module 60 is turned on, and an auxiliary signal transmitted by using the second auxiliary electrode 52 provides the auxiliary signal to the second touch drive electrode 112 by using the switch module 60. To be specific, a mutual capacitor corresponding to the second touch drive electrode 112 is charged. In addition, the touch drive chip 20 provides the non-touch scanning signal to the first touch drive electrode 111, the third touch drive electrode 113, and the fourth touch drive electrode 114 through the touch trace 30, and provides the control signal to control ends of the switch modules 60 corresponding to the first touch drive electrode 111, the third touch drive electrode 113, and the fourth touch drive electrode 114, to enable the switch module 60 to be turned off. To be specific, mutual capacitors that are respectively corresponding to the first touch drive electrode 111, the third touch drive electrode 113, and the fourth touch drive electrode 114 are discharged. At a third time point, the touch drive chip 20 provides the touch scanning signal to the third touch drive electrode 113 through the touch trace 30, and provides the control signal to the control end of the switch module 60 corresponding to the third touch drive electrode 113 through the control signal line 70, the switch module 60 is turned on, and an auxiliary signal transmitted by using the third auxiliary electrode 53 provides the auxiliary signal to the third touch drive electrode 113 by using the switch module 60. To be specific, a mutual capacitor corresponding to the third touch drive electrode 113 is charged. In addition, the touch drive chip 20 provides the non-touch scanning signal to the first touch drive electrode 111, the second touch drive electrode 112, and the fourth touch drive electrode 114 through the touch trace 30, and provides the control signal to control ends of the switch modules 60 corresponding to the first touch drive electrode 111, the second touch drive electrode 112, and the fourth touch drive electrode 114, to enable the switch module 60 to be turned off. To be specific, mutual capacitors that are respectively corresponding to the first touch drive electrode 111, the second touch drive electrode 112, and the fourth touch drive electrode 114 are discharged. At a fourth time point, the touch drive chip 20 provides the touch scanning signal to the fourth touch drive electrode 114 through the touch trace 30, and provides the control signal to the control end of the switch module 60 corresponding to the fourth touch drive electrode 114 through the control signal line 70, the switch module 60 is turned on, and an auxiliary signal transmitted by using the fourth auxiliary electrode 54 provides the auxiliary signal to the fourth touch drive electrode 114 by using the switch module 60. To be specific, a mutual capacitor corresponding to the fourth touch drive electrode 114 is charged. In addition, the touch drive chip 20 provides the non-touch scanning signal to the first touch drive electrode 111, the second touch drive electrode 112, and the third touch drive electrode 113 through the touch trace 30, and provides the control signal to control ends of the switch module 60 corresponding to the first touch drive electrode 111, the second touch drive electrode 112, and the third touch drive electrode 113, to enable the switch module 60 to be turned off. To be specific, mutual capacitors that are respectively corresponding to the first touch drive electrode 111, the second touch drive electrode 112, and the third touch drive electrode 113 are discharged. The touch drive chip 20 receives a touch detection signal fed back from the touch detection electrode 12 through the touch trace 30, and determines a touch position based on the touch detection signal.

In addition, still refer to FIG. 8. When the touch drive electrode 11 is corresponding to the four switch modules 60, a mutual capacitor formed at an intersection of the touch drive electrode 11 and the touch detection electrode 12 is corresponding to one switch module 60, and the auxiliary electrode 50 may independently charge a mutual capacitor corresponding to the switch module 60 by using the switch module 60, to further improve charging efficiency.

In addition, still refer to FIG. 8. When there are a plurality of switch modules 60 corresponding to the touch drive electrode 11, control ends of the switch modules 60 corresponding to the same touch drive electrode 11 are electrically connected, that is, electrically connected to the same control signal line 70, without separately providing the control signal line 70 for each switch module 60. In this way, a quantity of pins of the touch drive chip 20 that outputs the control signal may be reduced.

Figure 9:
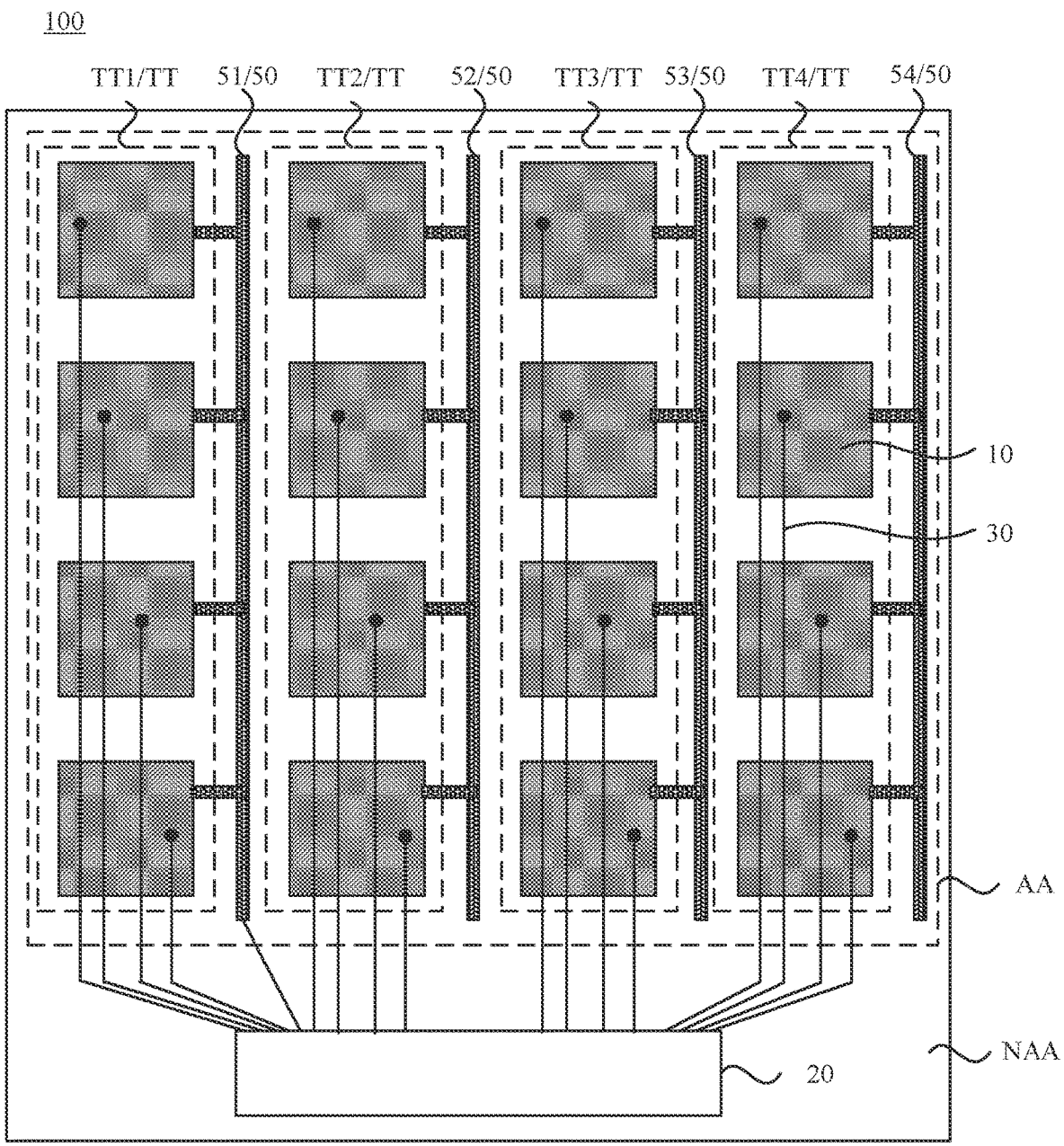
FIG. 9 is a schematic diagram of another structure of a touch display panel according to an embodiment of this application.

Refer to FIG. 9. A touch electrode 10 is a self-capacitance touch electrode. A touch display panel 100 includes a plurality of auxiliary electrodes 50. The auxiliary electrodes 50 are configured to receive an auxiliary signal sent by a touch drive chip 20. Touch electrodes 10 in a same touch area TT are electrically connected to a same auxiliary electrode 50. For example, when a plurality of touch areas TT include a first touch area TT1, a second touch area TT2, a third touch area TT3, and a fourth touch area TT4, there are, for example, four auxiliary electrodes 50. The four auxiliary electrodes 50 include a first auxiliary electrode 51, a second auxiliary electrode 52, a third auxiliary electrode 53, and a fourth auxiliary electrode 54. A plurality of touch electrodes 10 in the first touch area TT1 are electrically connected to the first auxiliary electrode 51. A plurality of touch electrodes 10 in the second touch area TT2 are electrically connected to the second auxiliary electrode 52. A plurality of touch electrodes 10 in the third touch area TT3 are electrically connected to the third auxiliary electrode 53. A plurality of touch electrodes 10 in the fourth touch area TT4 are electrically connected to the fourth auxiliary electrode 54.

In a touch frame, scanning of all touch electrodes 10 in the four touch areas TT in the touch display panel 100 are to be completed. Specifically, at a first time point, the touch drive chip 20 provides a touch scanning signal to the plurality of touch electrodes 10 in the first touch area TT1 through a touch trace 30, and provides an auxiliary signal to the plurality of touch electrodes 10 in the first touch area TT1 by using the first auxiliary electrode 51. At a second time point, the touch drive chip 20 provides the touch scanning signal to the plurality of touch electrodes 10 in the second touch area TT2, and provides the auxiliary signal to the plurality of touch electrodes 10 in the second touch area TT2 by using the second auxiliary electrode 52. At a third time point, the touch drive chip 20 provides the touch scanning signal to the plurality of touch electrodes 10 in the third touch area TT3, and provides the auxiliary signal to the plurality of touch electrodes 10 in the third touch area TT3 by using the third auxiliary electrode 53. At a fourth time point, the touch drive chip 20 provides the touch scanning signal to the plurality of touch electrodes 10 in the fourth touch area TT4, and provides the auxiliary signal to the plurality of touch electrodes 10 in the fourth touch area TT4 by using the fourth auxiliary electrode 54. The touch drive chip 20 receives a touch detection signal fed back from the touch electrode 10 through the touch trace 30, and determines a touch position based on the touch detection signal. Because the touch electrode 10 not only receives the touch scanning signal but also receives an auxiliary signal provided by using the auxiliary electrode 50, charging efficiency is improved. To be specific, although charging time for a capacitor is short, the capacitor may be quickly charged to a target value. This resolve a problem that the capacitor is undercharged when the charging time for the capacitor is short.

Figure 10:
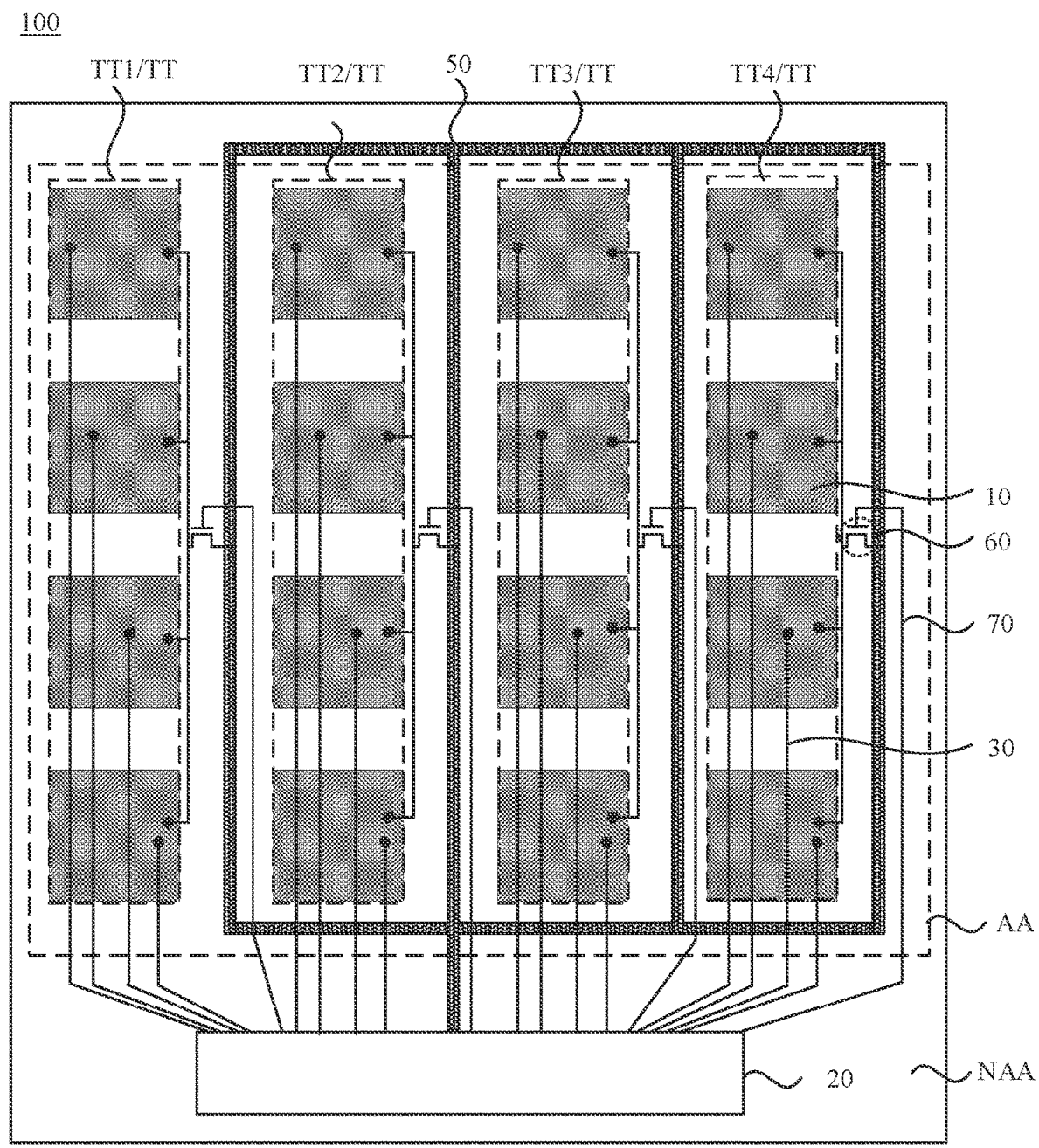
FIG. 10 is a schematic diagram of another structure of a touch display panel according to an embodiment of this application.

In this case, to reduce a quantity of pins of a touch drive chip 20 that outputs an auxiliary signal, refer to FIG. 10. A plurality of auxiliary electrodes 50 are electrically connected to each other, for example, the plurality of auxiliary electrodes 50 form a grid. A touch display panel 100 also includes a plurality of switch modules 60 and a plurality of control signal lines 70. The switch module 60 includes a control end, a first end, and a second end. All the touch electrodes 10 in one touch area TT are corresponding to one switch module 60, that is, a quantity of switch modules 60 is the same as a quantity of touch areas TT, for example, all are four. The first end of the switch module 60 is electrically connected to touch electrode 10 in a same touch area TT separately, the second end of the switch module 60 is electrically connected to the auxiliary electrodes 50, and the control end of the switch module 60 is electrically connected to the control signal line 70. Therefore, a control signal sent by a touch drive chip 20 is obtained through the control signal line 70, to control the switch module 60 to be turned on or turned off.

At a first time point, the touch drive chip 20 provides a touch scanning signal to a plurality of touch electrodes 10 in a first touch area TT1 through a touch trace 30, and in addition, the touch drive chip 20 sends the control signal to a control end of a switch module 60 corresponding to the first touch area TT1 through the control signal line 70, the switch module 60 is turned on, and switch modules 60 that are corresponding to other touch areas TT are turned off. In this way, the touch drive chip 20 provides the auxiliary signal to the plurality of touch electrodes 10 in the first touch area TT1 by using the auxiliary electrodes 50 and the conducive switch modules 60. At a second time point, the touch drive chip 20 provides the touch scanning signal to plurality of touch electrodes 10 in a second touch area TT2 through the touch trace 30, and in addition, the touch drive chip 20 sends the control signal to a control end of a switch module 60 corresponding to the second touch area TT2 through the control signal line 70, the switch module 60 is turned on, and the switch modules 60 that are corresponding to other touch areas TT are turned off. In this way, the touch drive chip 20 provides the auxiliary signal to the plurality of touch electrodes 10 in the second touch area TT2 by using the auxiliary electrodes 50 and the conducive switch modules 60. At a third time point, the touch drive chip 20 provides the touch scanning signal to plurality of touch electrodes 10 in a third touch area TT3 through the touch trace 30, and in addition, the touch drive chip 20 sends the control signal to a control end of a switch module 60 corresponding to the third touch area TT3 through the control signal line 70, the switch module 60 is turned on, and the switch modules 60 that are corresponding to other touch areas TT are turned off. In this way, the touch drive chip 20 provides the auxiliary signal to the plurality of touch electrodes 10 in the third touch area TT3 by using the auxiliary electrodes 50 and the conducive switch modules 60. At a fourth time point, the touch drive chip 20 provides the touch scanning signal to plurality of touch electrodes 10 in a fourth touch area TT4 through the touch trace 30, and in addition, the touch drive chip 20 sends the control signal to a control end of a switch module 60 corresponding to the fourth touch area TT4 through the control signal line 70, the switch module 60 is turned on, and the switch modules 60 that are corresponding to other touch areas TT are turned off. In this way, the touch drive chip 20 provides the auxiliary signal to the plurality of touch electrodes 10 in the fourth touch area TT4 by using the auxiliary electrodes 50 and the conducive switch modules 60. The touch drive chip 20 receives a touch detection signal fed back from the touch electrode 10 through the touch trace 30, and determines a touch position based on the touch detection signal.

Figure 11:
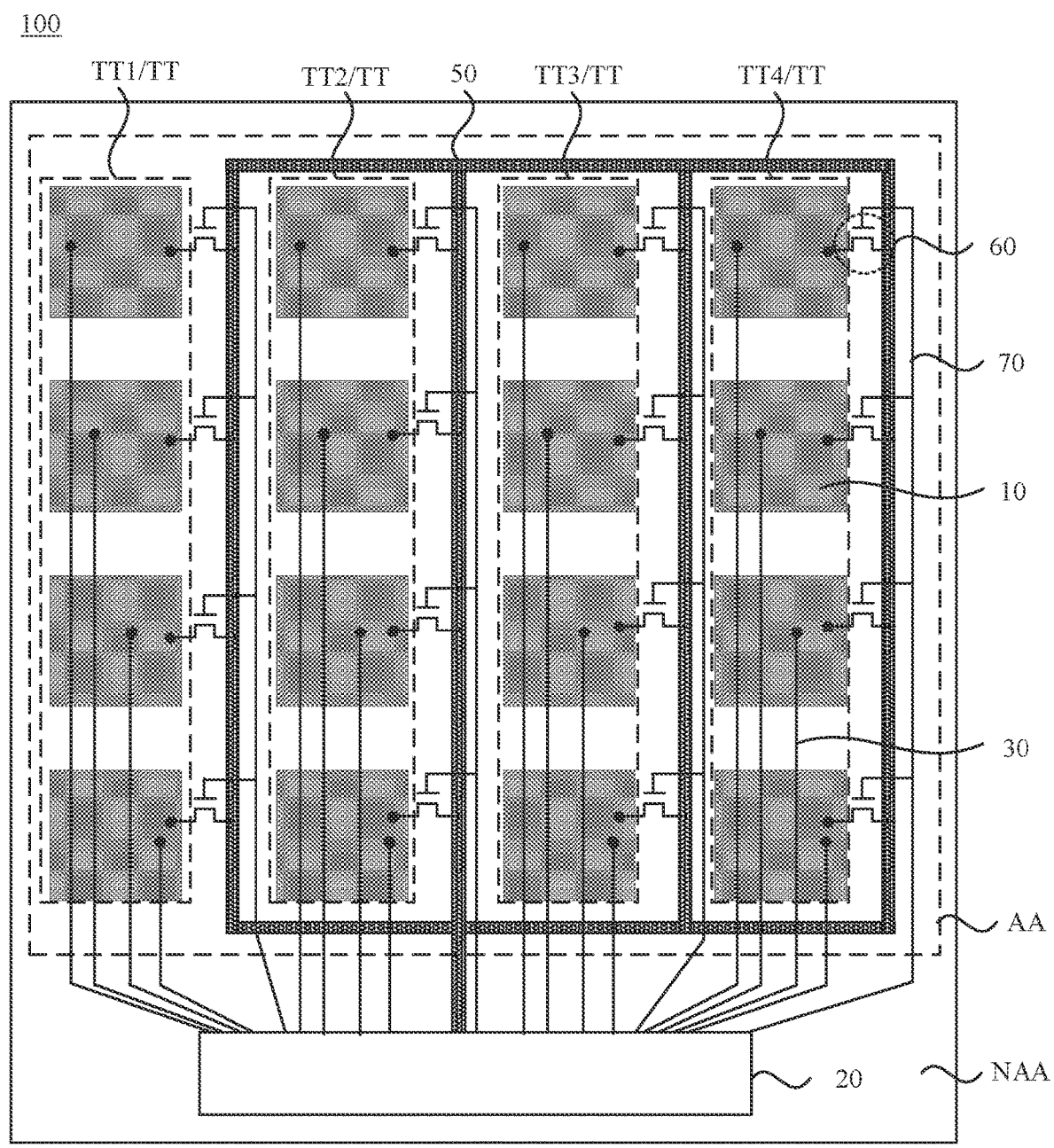
FIG. 11 is a schematic diagram of another structure of a touch display panel according to an embodiment of this application.

It should be noted that, in FIG. 10, an example in which a plurality of touch electrodes 10 in the touch area TT are corresponding to the switch modules 60 is used for descriptions, and does not constitute any limitation on this application. In other implementations of this application, the plurality of touch electrodes 10 in one touch area TT are corresponding to the plurality of switch modules 60. For example, refer to FIG. 11. A plurality of switch modules 60 are electrically connected to a plurality of touch electrodes 10 in a one-to-one correspondence, that is, one touch electrode 10 is corresponding to one switch module 60. To be specific, a quantity of switch modules 60 is the same as a quantity of touch electrodes 10. A first end of the switch module 60 is electrically connected to the touch electrode 10, a second end of the switch module 60 is electrically connected to the auxiliary electrode 50, and a control end of the switch module 60 is electrically connected to a control signal line 70. A control signal sent by a touch drive chip 20 is obtained through the control signal line 70. Optionally, control ends of the switch modules 60 that are corresponding to the touch electrodes 10 in a same touch area TT are electrically connected, that is, electrically connected to a same control signal line 70, without separately providing the control signal line 70 for each switch module 60. In this way, a quantity of pins of the touch drive chip 20 may be reduced.

In two cases in which the touch electrode 10 is a self-capacitance touch electrode and the touch electrode 10 is a mutual-capacitance touch electrode, for the switch module 60, a type of the switch module 60 is not limited in embodiments of this application, provided that switch functions are within the scope of protection of this application. For example, refer to FIG. 8 and FIG. 11. The foregoing switch module 60 may, for example, include a transistor. To distinguish the transistor in subsequent embodiments, a transistor of the switch module 60 is, for example, a first transistor 61.

It can be learned from the foregoing description that a touch display panel 100 provided by embodiments of this application may be an LCD panel, or may be an OLED display panel.

Figure 12:
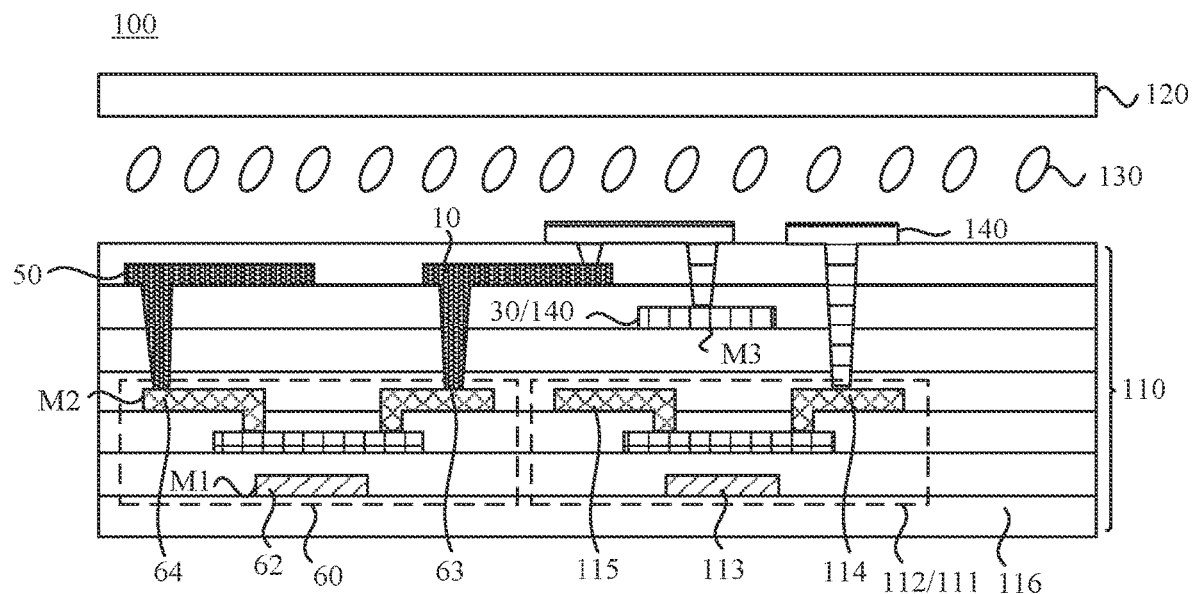
FIG. 12 is a schematic diagram of a structure of a film layer of a touch display panel according to an embodiment of this application.

In an example, the touch display panel 100 is an LCD panel. When the touch display panel 100 is an LCD display panel, refer to FIG. 12. FIG. 12 is a schematic diagram of a structure of a film layer of an LCD panel. The LCD panel includes an array substrate 110, a color film substrate 120, and a liquid crystal layer 130 disposed between the array substrate 110 and the color film substrate 120. The color film substrate 120 includes a color filter layer and a black matrix (not shown in the figure) configured to cover a drive circuit on the array substrate. The color filter layer may include a red-colored ring resistor, a green-colored ring resistor, and a blue-colored ring resistor, and is not limited in embodiments of this application. The array substrate 110 includes a substrate 116 and a pixel driving circuit 111 disposed on the substrate 116. The pixel driving circuit 111 includes a plurality of transistors. To distinguish the transistors in the foregoing description, the transistor in the pixel driving circuit 111 is, for example, a second transistor 112. The array substrate 110 includes a first metal layer M1, a second metal layer M2, a third metal layer M3, and an insulation layer disposed between metal layers. The first metal layer M1 includes a gate 113 of the second transistor 112 and a scan line (not shown in the figure). The first metal layer M1 further includes a gate 62 of a first transistor 61 and a control signal line (not shown in the figure). The second metal layer M2 includes a first electrode 114, a second electrode 115, and a data line of the second transistor 112 (not shown in the figure). The second metal layer M2 further includes a first electrode 63 and a second electrode 64 of the first transistor 61. The third metal layer M3 includes a touch trace 30. The array substrate 110 further includes a common electrode 140 and a pixel electrode 150. The common electrode 140 is electrically connected to the touch trace 30. The common electrode 140 is multiplexed as a touch electrode 10. An auxiliary electrode 50 and the common electrode 140 are disposed on a same layer.

Because the gate 62 of the first transistor 61, the control signal line, and the gate 113 of the second transistor 112 are formed with a same material in a same process, the first electrode 63 and the second electrode 64 of the first transistor 61, and the first electrode 114 and the second electrode 115 of the second transistor 112 are formed with a same material in a same process, and the auxiliary electrode 50 and the common electrode 140 are formed with a same material in a same process, processes are reduced. In addition, in comparison that the gate 62 of the first transistor 61, the control signal line, and the gate 113 of the second transistor 112 are separately disposed at different film layers, the first electrode 63 and the second electrode 64 of the first transistor 61, and the first electrode 114 and the second electrode 115 of the second transistor 112 are separately disposed at different film layers, and the auxiliary electrode 50 and the common electrode 140 are separately disposed at different film layers, in this embodiment of this application, the gate 62 of the first transistor 61, the control signal line, and the gate 113 of the second transistor 112 are disposed at a same layer, the first electrode 63 and the second electrode 64 of the first transistor 61, and the first electrode 114 and the second electrode 115 of the second transistor 112 are disposed at a same film layer, and the auxiliary electrode 50 and the common electrode 140 are disposed at a same layer. Therefore, an overall thickness of a touch display panel 100 is reduced, and the touch display panel 100 is lighter and thinner.

It should be noted that the first electrode 63 of the first transistor 61 in this embodiment is one of a source and a drain of the first transistor 61, and the second electrode 64 of the first transistor 61 is the other of the source and the drain of the first transistor 61. The first electrode 114 of the second transistor 112 is one of a source and a drain of the second transistor 112, and the second electrode 115 of the second transistor 112 is the other of the source and the drain of the second transistor 112. Transistors in the following embodiments are the same as this. Details are not described in the following embodiments.

It should be further noted that the structure of the film layer of the LCD panel is described by using an example in which the touch electrode 10 is a self-capacitance touch electrode, and does not constitute any limitation on this application. A person skilled in the art may dispose positions of the first transistor 61 and the auxiliary electrode 50 based on the structure of the film layer of the touch display panel 100. It should be further noted that the foregoing only illustrates a relationship between film layers of the LCD panel, and does not constitute any limitation on this application. A person skilled in the art may dispose a position of a film layer of each structure based on an actual situation. In other optional implementations, the first transistor 61, the auxiliary electrode 50, and a control signal line 70 may further be disposed separately, that is, do not share a film layer with an original film layer of the LCD panel. When the first transistor 61, the auxiliary electrode 50, and the control signal line 70 are separately disposed, the auxiliary electrode 50 and the control signal line 70 may be disposed in a same layer.

Figure 13:
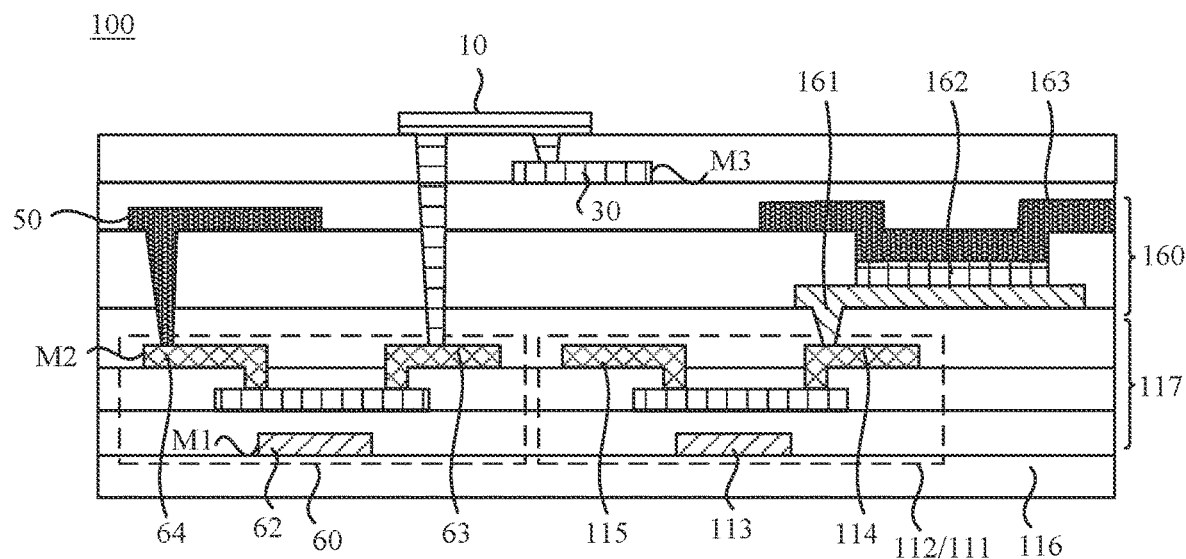
FIG. 13 is a schematic diagram of another structure of a film layer of a touch display panel according to an embodiment of this application.

In another example, a touch display panel 100 is an OLED display panel. When the touch display panel 100 is an OLED display panel, refer to FIG. 13. FIG. 13 is a schematic diagram of a structure of a film layer of an OLED display panel. The OLED display panel includes a substrate 116, a pixel circuit layer 117 disposed on the substrate 116, and a light emitting layer 160 disposed on a side, away from the substrate 116, of the pixel circuit layer 117. The light emitting layer 160 includes an anode 161, a light emitting functional layer 162, and a transparent cathode 163. The OLED display panel may further include a packaging layer (not shown in the figure) configured to perform water-oxygen protection for the light emitting functional layer 162. The pixel circuit layer 117 includes a plurality of pixel driving circuits 111. The pixel driving circuit 111 includes a plurality of transistors. To distinguish the transistors in the foregoing description, the transistor in the pixel driving circuit 111 is, for example, a second transistor 112. An array substrate 110 includes a first metal layer M1, a second metal layer M2, a third metal layer M3, and an insulation layer disposed between metal layers. The first metal layer M1 includes a gate 113 of the second transistor 112 and a scan line (not shown in the figure). The first metal layer M1 further includes a gate 62 of a first transistor 61 and a control signal line (not shown in the figure). The second metal layer M2 includes a first electrode 114, a second electrode 115, and a data line of the second transistor 112 (not shown in the figure). The second metal layer M2 further includes a first electrode 63 and a second electrode 64 of the first transistor 61. The third metal layer M3 includes a touch trace 30. The OLED display panel further includes a touch electrode 10. The touch electrode 10 is electrically connected to the touch trace 30. An auxiliary electrode 50 and the transparent cathode 163 are disposed in a same layer.

Because the gate 62 of the first transistor 61, the control signal line, and the gate 113 of the second transistor 112 are formed with a same material in a same process, the first electrode 63 and the second electrode 64 of the first transistor 61, and the first electrode 114 and the second electrode 115 of the second transistor 112 are formed with a same material in a same process, and the auxiliary electrode 50 and the transparent cathode 163 are formed with a same material in a same process, processes are reduced. In addition, in comparison that the gate 62 of the first transistor 61, the control signal line, and the gate 113 of the second transistor 112 are separately disposed at different film layers, the first electrode 63 and the second electrode 64 of the first transistor 61, and the first electrode 114 and the second electrode 115 of the second transistor 112 are separately disposed at different film layers, and the auxiliary electrode 50 and the transparent cathode 163 are separately disposed at different film layers, in this embodiment of this application, the gate 62 of the first transistor 61, the control signal line, and the gate 113 of the second transistor 112 are disposed at a same layer, the first electrode 63 and the second electrode 64 of the first transistor 61, and the first electrode 114 and the second electrode 115 of the second transistor 112 are disposed at a same film layer, and the auxiliary electrode 50 and the transparent cathode 163 are disposed at a same layer. Therefore, an overall thickness of the touch display panel 100 is reduced, and the touch display panel 100 is lighter and thinner.

It should be noted that the structure of the film layer of the OLED display panel is described by using an example in which the touch electrode 10 is a self-capacitance touch electrode, and does not constitute any limitation on this application. A person skilled in the art may dispose positions of the first transistor 61 and the auxiliary electrode 50 based on the structure of the film layer of the touch display panel 100.

It should be further noted that the foregoing only illustrates a relationship between film layers of the OLED display panel, and does not constitute any limitation on this application. A person skilled in the art may dispose a position of a film layer of each structure based on an actual situation. In other optional implementations, the first transistor 61, the auxiliary electrode 50, and the control signal line 70 may further be disposed separately, that is, do not share a film layer with an original film layer of the OLED display panel. When the first transistor 61, the auxiliary electrode 50, and the control signal line 70 are separately disposed, the auxiliary electrode 50 and the control signal line 70 may be disposed in a same layer.

The foregoing embodiments are merely intended to describe the technical solutions in this application, but are not intended to limit this application. Although this application is described in detail with reference to the foregoing embodiments, a person of ordinary skill in the art should understand that they may still make modifications to the technical solutions described in the foregoing embodiments or make equivalent replacements to some technical features thereof. However, these modifications or replacements do not make the essence of the corresponding technical solutions depart from the scope of the technical solutions in embodiments of this application.

What is claimed is:

1. A touch display panel, comprising:
a touch electrode, wherein the touch electrode is configured to receive a touch scanning signal; and
at least one auxiliary electrode, electrically connected to the touch electrode and configured to provide an auxiliary signal to the touch electrode based on the touch electrode receiving the touch scanning signal, wherein the auxiliary signal has a same voltage value as the touch scanning signal;
wherein the touch display panel comprises N touch areas, wherein each touch area of the N touch areas comprises a plurality of self-capacitance touch electrodes;
wherein the touch display panel comprises N auxiliary electrodes, wherein the N auxiliary electrodes are electrically connected;
wherein the plurality of self-capacitance touch electrodes in a same touch area of the N touch areas is electrically connected to an auxiliary electrode of the at least one auxiliary electrode in the same touch area;
wherein N is a positive integer greater than or equal to 1;
wherein the touch display panel further comprises a plurality of switch circuits and a plurality of control signal lines, and wherein each switch circuit of the plurality of switch circuits comprises a first end, a second end, and a control end;
wherein touch electrodes in the same touch area of the N touch areas are electrically connected to a first end of at least one switch circuit of the plurality of switch circuits, wherein a second end of the at least one switch circuit is electrically connected to the auxiliary electrode in the same touch area, and wherein a control end of the at least one switch circuit is electrically connected to a control signal line of the plurality of control signal lines;
wherein the control signal line is used to send a control signal to the control end of the at least one switch circuit, to control the at least one switch circuit to be turned on or turned off;
wherein at a first time point, based on self-capacitance touch electrodes in an $i^{th}$ touch area receiving the touch scanning signal:
a switch circuit electrically connected to the touch electrodes in the $i^{th}$ touch area is turned on, and an auxiliary signal is transmitted on the auxiliary electrode to the self-capacitance touch electrode in the $i^{th}$ touch area; and
a capacitor corresponding to the touch electrodes is charged, and the switch circuits electrically connected to the touch electrodes in other touch regions among the N touch areas excluding the $i^{th}$ touch area are turned off, for discharging the capacitor corresponding to the touch electrodes, wherein i is a positive integer greater than or equal to 1, and i is less than or equal to N, for identifying a touch operation performed by a user in the $i^{th}$ touch area at a first time point; and
wherein at a second time point, based on self-capacitance touch electrodes in a $k^{th}$ touch area receiving the touch scanning signal:
a switch circuit electrically connected to the touch electrodes in the $k^{th}$ touch area is turned on, and an auxiliary signal is transmitted on the auxiliary electrode to the self-capacitance touch electrode in the $k^{th}$ touch area; and
the capacitor corresponding to the touch electrodes is charged, and the switch circuits electrically connected to the touch electrodes in other touch regions among the N touch areas excluding the $k^{th}$ touch area are turned off, for discharging the capacitor corresponding to the touch electrodes, wherein k is a positive integer greater than or equal to 1, and k is less than or equal to N, for identifying the touch operation performed by the user in the $k^{th}$ touch area at the first time point.

2. The touch display panel according to claim 1, wherein the plurality of self-capacitance touch electrodes in the $i^{th}$ touch area are electrically connected to first ends of the plurality of switch circuits in a one-to-one correspondence.

3. The touch display panel according to claim 1, wherein based on the self-capacitance touch electrodes in the same touch area being electrically connected to first ends of at least two switch circuits, control ends of the switch circuits electrically connected to the self-capacitance touch electrodes in the $i^{th}$ touch area are electrically connected to a same control signal line.

4. The touch display panel according to claim 1,
wherein the touch electrode comprises a mutual-capacitance touch electrode;
wherein the mutual-capacitance touch electrode comprises L touch drive electrodes and a plurality of touch detection electrodes, the L touch drive electrodes extend in a first direction and are arranged in a second direction, and the plurality of touch detection electrodes extend in the second direction and are arranged in the first direction, wherein the first direction intersects the second direction;
wherein the touch display panel comprises L auxiliary electrodes, wherein L is a positive integer greater than or equal to 1;
wherein a plurality of auxiliary electrodes are electrically connected to a plurality of touch drive electrodes in a one-to-one correspondence; and
wherein each auxiliary electrode in the plurality of auxiliary electrodes is configured to provide the auxiliary signal to the touch drive electrode connected to an auxiliary electrode base on the touch drive electrode receiving the touch scanning signal.

5. The touch display panel according to claim 4,
wherein the L auxiliary electrodes are electrically connected;
wherein the touch display panel further comprises a plurality of switch circuits and a plurality of control signal lines, and wherein each switch circuit of the plurality of switch circuits comprises a first end, a second end, and a control end;
wherein one touch drive electrode of the L touch drive electrodes is electrically connected to a first end of at least one switch circuit, a second end of the at least one switch circuit is electrically connected to the auxiliary electrode connected to the one touch drive electrode, a control end of the switch circuit is electrically connected to the control signal line, and the control signal line is used to send a control signal to the control end of the switch circuit, to control the switch circuit to be turned on or turned off; and wherein based on a $j^{th}$ touch drive electrode receiving the touch scanning signal, a switch circuit electrically connected to the $j^{th}$ touch drive electrode is configured to transmit an auxiliary signal transmitted on the auxiliary electrode to the $j^{th}$ touch drive electrode, wherein j is a positive integer greater than or equal to 1, and j is less than or equal to L.

6. The touch display panel according to claim 5,
wherein the L touch drive electrodes intersect the plurality of touch detection electrodes to form a plurality of mutual capacitors; and
wherein the plurality of mutual capacitors are electrically connected to first ends of the plurality of switch circuits in a one-to-one correspondence.

7. The touch display panel according to claim 5, wherein based on a same touch drive electrode being electrically connected to first ends of at least two switch circuits, a control end of the switch circuit electrically connected to the $j^{th}$ touch drive electrode is electrically connected to a same control signal line.

8. The touch display panel according to claim 1, wherein the control signal line and the auxiliary electrode are disposed at a same layer.

9. The touch display panel according to claim 1, wherein the switch circuit comprises a first transistor.

10. The touch display panel according to claim 9,
wherein the touch display panel comprises a liquid crystal display panel;
wherein the liquid crystal display panel comprises an array substrate, a color film substrate, and a liquid crystal layer disposed between the array substrate and the color film substrate;
wherein the array substrate comprises a substrate, a pixel driving circuit disposed on the substrate, and a pixel electrode and a common electrode that are disposed on a side, away from the substrate, of the pixel driving circuit;
wherein the pixel driving circuit comprises at least one second transistor;
wherein each of the first transistor and the second transistor comprises a first electrode, a second electrode, and a gate;
wherein the gate of the first transistor, the control signal line, and the gate of the second transistor are disposed at a same layer;
wherein the first electrode and the second electrode of the first transistor, and the first electrode and second electrode of the second transistor are disposed at a same layer; and
wherein the auxiliary electrode and the common electrode are disposed at a same layer.

11. The touch display panel according to claim 9,
wherein a pixel circuit layer comprises a plurality of pixel driving circuits, and the pixel driving circuit comprises at least one second transistor;
wherein each of the first transistor and the second transistor comprises a first electrode, a second electrode, and a gate;
wherein the gate of the first transistor, the control signal line, and the gate of the second transistor are disposed at a same layer;
wherein the first electrode and the second electrode of the first transistor, and the first electrode and second electrode of the second transistor are disposed at a same layer; and
wherein the auxiliary electrode and a cathode are disposed at a same layer.

12. A touch display apparatus, comprising:
a touch display panel that includes an organic light emitting diode display panel, a touch electrode, and at least one auxiliary electrode;
wherein the touch electrode is configured to receive a touch scanning signal;
wherein the at least one auxiliary electrode is electrically connected to the touch electrode and configured to provide an auxiliary signal to the touch electrode based on the touch electrode receiving the touch scanning signal, wherein the auxiliary signal has a same voltage value as the touch scanning signal;
wherein the organic light emitting diode display panel comprises a substrate, a pixel circuit layer disposed on the substrate, and a light emitting layer disposed on a side, away from the substrate, of the pixel circuit layer;
wherein the light emitting layer comprises an anode located on the side, away from the substrate, of the pixel circuit layer, a light emitting functional layer located on a side, away from the substrate, of the anode, and a cathode located on a side, away from the anode, of the light emitting functional layer;
wherein the touch display panel comprises N touch areas, wherein each touch area of the N touch areas comprises a plurality of self-capacitance touch electrodes;
wherein the touch display panel comprises N auxiliary electrodes, wherein the N auxiliary electrodes are electrically connected;
wherein the plurality of self-capacitance touch electrodes in a same touch area of the N touch areas is electrically connected to an auxiliary electrode of the at least one auxiliary electrode in the same touch area;
wherein N is a positive integer greater than or equal to 1;
wherein the touch display panel further comprises a plurality of switch circuits and a plurality of control signal lines, and wherein each switch circuit of the plurality of switch circuits comprises a first end, a second end, and a control end;
wherein touch electrodes in the same touch area of the N touch areas are electrically connected to a first end of at least one switch circuit of the plurality of switch circuits, wherein a second end of the at least one switch circuit is electrically connected to the auxiliary electrode in the same touch area, and wherein a control end of the at least one switch circuit is electrically connected to a control signal line of the plurality of control signal lines;
wherein the control signal line is used to send a control signal to the control end of the at least one switch circuit, to control the at least one switch circuit to be turned on or turned off;
wherein at a first time point, based on self-capacitance touch electrodes in an $i^{th}$ touch area receiving the touch scanning signal:
a switch circuit electrically connected to the touch electrodes in the $i^{th}$ touch area is turned on, and an auxiliary signal is transmitted on the auxiliary electrode to the self-capacitance touch electrode in the $i^{th}$ touch area; and a capacitor corresponding to the touch electrodes is charged, and the switch circuits electrically connected to the touch electrodes in other touch regions among the N touch areas excluding the $i^{th}$ touch area are turned off, for discharging the capacitor corresponding to the touch electrodes, wherein i is a positive integer greater than or equal to 1, and i is less than or equal to N, for identifying a touch operation performed by a user in the $i^{th}$ touch area at a first time point; and wherein at a second time point, based on self-capacitance touch electrodes in a $k^{th}$ touch area receiving the touch scanning signal:

a switch circuit electrically connected to the touch electrodes in the $k^{th}$ touch area is turned on, and an auxiliary signal is transmitted on the auxiliary electrode to the self-capacitance touch electrode in the $k^{th}$ touch area; and the capacitor corresponding to the touch electrodes is charged, and the switch circuits electrically connected to the touch electrodes in other touch regions among the N touch areas excluding the $k^{th}$ touch area are turned off, for discharging the capacitor corresponding to the touch electrodes, wherein k is a positive integer greater than or equal to 1, and k is less than or equal to N, for identifying the touch operation performed by the user in the $k^{th}$ touch area at the first time point.

13. A drive method for a touch display panel that includes an organic light emitting diode display panel, a touch electrode, and at least one auxiliary electrode, wherein the touch electrode is configured to receive a touch scanning signal, and wherein the at least one auxiliary electrode is electrically connected to the touch electrode and configured to provide an auxiliary signal to the touch electrode based on the touch electrode receiving the touch scanning signal, wherein the auxiliary signal has a same voltage value as the touch scanning signal, wherein the drive method comprises:

sending a touch scanning signal to a to-be-scanned touch electrode, and sending the auxiliary signal to an auxiliary electrode, to send the auxiliary signal to the to-be-scanned touch electrode by using the auxiliary electrode, wherein the to-be-scanned touch electrode is a touch electrode receiving the touch scanning signal;

wherein the organic light emitting diode display panel comprises a substrate, a pixel circuit layer disposed on the substrate, and a light emitting layer disposed on a side, away from the substrate, of the pixel circuit layer;

wherein the light emitting layer comprises an anode located on the side, away from the substrate, of the pixel circuit layer, a light emitting functional layer located on a side, away from the substrate, of the anode, and a cathode located on a side, away from the anode, of the light emitting functional layer;

wherein the touch display panel comprises N touch areas, wherein each touch area of the N touch areas comprises a plurality of self-capacitance touch electrodes;

wherein the touch display panel comprises N auxiliary electrodes, wherein the N auxiliary electrodes are electrically connected;

wherein the plurality of self-capacitance touch electrodes in a same touch area of the N touch areas is electrically connected to an auxiliary electrode of the at least one auxiliary electrode in the same touch area;

wherein N is a positive integer greater than or equal to 1;

wherein the touch display panel further comprises a plurality of switch circuits and a plurality of control signal lines, and wherein each switch circuit of the plurality of switch circuits comprises a first end, a second end, and a control end;

wherein touch electrodes in the same touch area of the N touch areas are electrically connected to a first end of at least one switch circuit of the plurality of switch circuits, wherein a second end of the at least one switch circuit is electrically connected to the auxiliary electrode in the same touch area, and wherein a control end of the at least one switch circuit is electrically connected to a control signal line of the plurality of control signal lines;

wherein the control signal line is used to send a control signal to the control end of the at least one switch circuit, to control the at least one switch circuit to be turned on or turned off;

wherein at a first time point, based on self-capacitance touch electrodes in an $i^{th}$ touch area receiving the touch scanning signal:

a switch circuit electrically connected to the touch electrodes in the $i^{th}$ touch area is turned on, and an auxiliary signal is transmitted on the auxiliary electrode to the self-capacitance touch electrode in the $i^{th}$ touch area; and a capacitor corresponding to the touch electrodes is charged, and the switch circuits electrically connected to the touch electrodes in other touch regions among the N touch areas excluding the $i^{th}$ touch area are turned off, for discharging the capacitor corresponding to the touch electrodes, wherein i is a positive integer greater than or equal to 1, and i is less than or equal to N, for identifying a touch operation performed by a user in the $i^{th}$ touch area at a first time point; and wherein at a second time point, based on self-capacitance touch electrodes in a $k^{th}$ touch area receiving the touch scanning signal:

a switch circuit electrically connected to the touch electrodes in the $k^{th}$ touch area is turned on, and an auxiliary signal is transmitted on the auxiliary electrode to the self-capacitance touch electrode in the $k^{th}$ touch area; and the capacitor corresponding to the touch electrodes is charged, and the switch circuits electrically connected to the touch electrodes in other touch regions among the N touch areas excluding the $k^{th}$ touch area are turned off, for discharging the capacitor corresponding to the touch electrodes, wherein k is a positive integer greater than or equal to 1, and k is less than or equal to N, for identifying the touch operation performed by the user in the $k^{th}$ touch area at the first time point.

14. The drive method for a touch display panel according to claim 13, wherein the sending the touch scanning signal to the to-be-scanned touch electrode, and the sending the auxiliary signal to the auxiliary electrode comprises:

sending the touch scanning signal to a self-capacitance touch electrode in the $i^{th}$ touch area, and sending the auxiliary signal to an auxiliary electrode electrically connected to the self-capacitance touch electrode in the $i^{th}$ touch area; and cyclically performing the foregoing steps until scanning of self-capacitance touch electrodes in the N touch areas is completed.

15. The drive method for a touch display panel according to claim 14,
wherein the sending the touch scanning signal to the self-capacitance touch electrode in the $i^{th}$ touch area, and the sending the auxiliary signal to the auxiliary electrode electrically connected to the self-capacitance touch electrode in the $i^{th}$ touch area comprises:
sending a control signal to an $i^{th}$ control signal line, to enable a switch circuit electrically connected to the $i^{th}$ control signal line to be turned on, wherein the $i^{th}$ control signal line is a control signal line electrically connected to a control end of a switch circuit corresponding to the $i^{th}$ touch area.

16. The drive method for a touch display panel according to claim 13,
wherein the touch electrode comprises a mutual-capacitance touch electrode, wherein the mutual-capacitance touch electrode comprises L touch drive electrodes and a plurality of touch detection electrodes, wherein the L touch drive electrodes extend in a first direction and are arranged in a second direction, wherein the plurality of touch detection electrodes extend in the second direction and are arranged in the first direction, wherein the first direction intersects the second direction, wherein the touch display panel comprises L auxiliary electrodes, wherein L is a positive integer greater than or equal to 1, and wherein the L auxiliary electrodes are electrically connected to L touch drive electrodes in a one-to-one correspondence; and
wherein the sending the touch scanning signal to the to-be-scanned touch electrode, and the sending the auxiliary signal to the auxiliary electrode comprises:
sending the touch scanning signal to a $j^{th}$ touch drive electrode, and sending the auxiliary signal to an auxiliary electrode electrically connected to the $j^{th}$ touch drive electrode; and
cyclically performing foregoing steps until scanning of L touch drive electrodes is completed, wherein j and L are positive integers greater than or equal to 1, and j is less than or equal to L.

17. The drive method for a touch display panel according to claim 16,
wherein the L auxiliary electrodes are electrically connected, wherein the touch display panel further comprises a plurality of switch circuits and a plurality of control signal lines, wherein each switch circuit of the plurality of switch circuits comprises a first end, a second end, and a control end, wherein one touch drive electrode of the L touch drive electrodes is electrically connected to a first end of at least one switch circuit, a second end of the at least one switch circuit is electrically connected to the auxiliary electrode connected to the one touch drive electrode, and wherein the control end of the switch circuit is electrically connected to the control signal line; and
wherein when sending the touch scanning signal to the $j^{th}$ touch drive electrode, and the sending the auxiliary signal to the auxiliary electrode electrically connected to the $j^{th}$ touch drive electrode comprises:
sending a control signal to a $j^{th}$ control signal line, to enable a switch circuit electrically connected to the $j^{th}$ control signal line to be turned on, wherein the $j^{th}$ control signal line is a control signal line electrically connected to a control end of a switch circuit corresponding to the $j^{th}$ touch drive electrode.

* * * * *